United States Patent

Cook

[15] 3,678,190
[45] July 18, 1972

[54] AUTOMATIC PHOTO COMPARISION SYSTEM

[72] Inventor: William H. Cook, Los Angeles, Calif.

[73] Assignee: The Bunker-Ramo Corporation, Canoga Park, Calif.

[22] Filed: Dec. 21, 1966

[21] Appl. No.: 605,951

Related U.S. Application Data

[63] Continuation of Ser. No. 274,452, April 22, 1963, abandoned.

[52] U.S. Cl..................................178/6.8, 178/6, 178/6.5, 343/5 MM
[51] Int. Cl. .........................................................H04n 3/02
[58] Field of Search..........................88/14 E; 178/6, 6.5, 6.8; 343/5 MM, 7.7

[56] References Cited

UNITED STATES PATENTS

2,626,989  1/1953  Brown..............................88/14 E X

*Primary Examiner*—Benjamin A. Borchelt
*Assistant Examiner*—N. Moskowitz
*Attorney*—Frederick M. Arbuckle

[57] ABSTRACT

Apparatus for automatically scanning sets of stereoscopic photographs, some of which represent particular terrain at other times than do the other photographs, and providing output representations of the terrain involved which may be compared automatically to show cultural changes in the terrain which may have taken place or to provide an indication that such cultural changes have taken place.

16 Claims, 23 Drawing Figures

Patented July 18, 1972

INVENTOR.
WILLIAM H. COOK
BY Fraser and Bogucki
ATTORNEYS

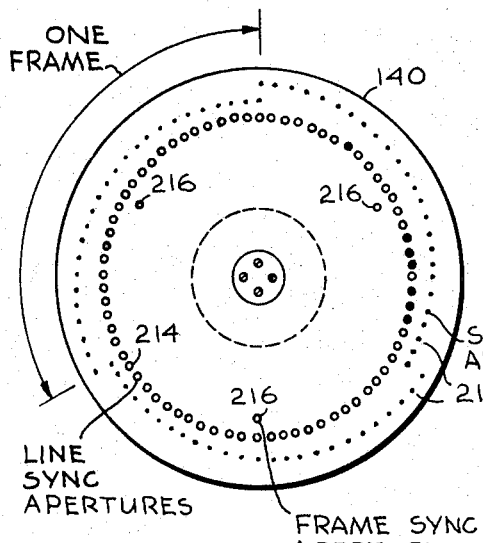
Fig. 9
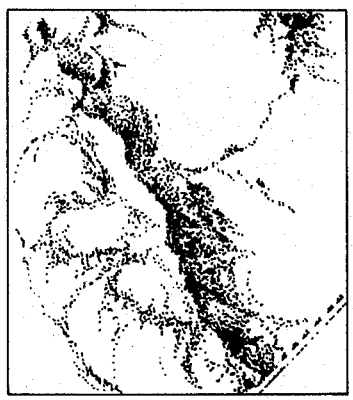
Fig. 4
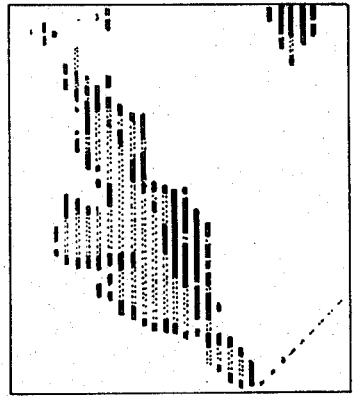
Fig. 5
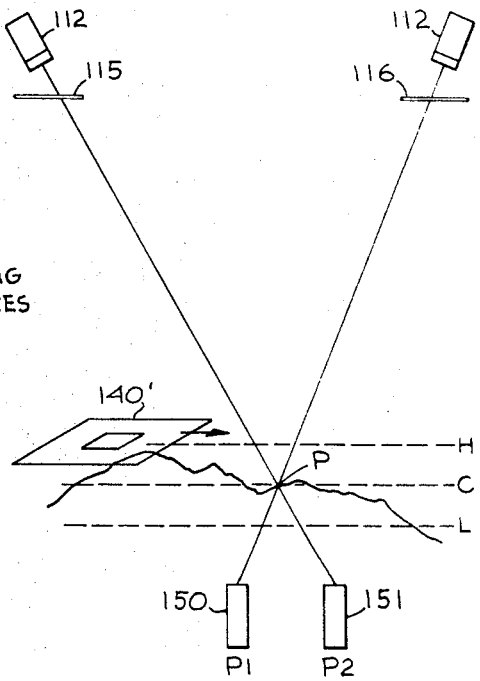
Fig. 11
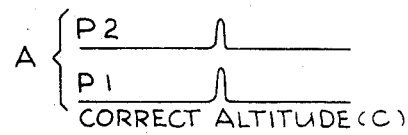
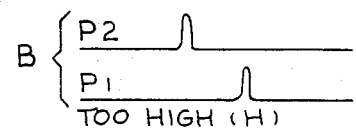
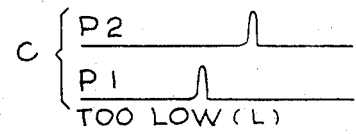
Fig. 12
WILLIAM H. COOK
INVENTOR.
BY
Fraser and Bogucki
ATTORNEYS Patented July 18, 1972

WILLIAM H. COOK
INVENTOR.

BY
Fraser and Bogucki
ATTORNEYS

WILLIAM H. COOK
INVENTOR.

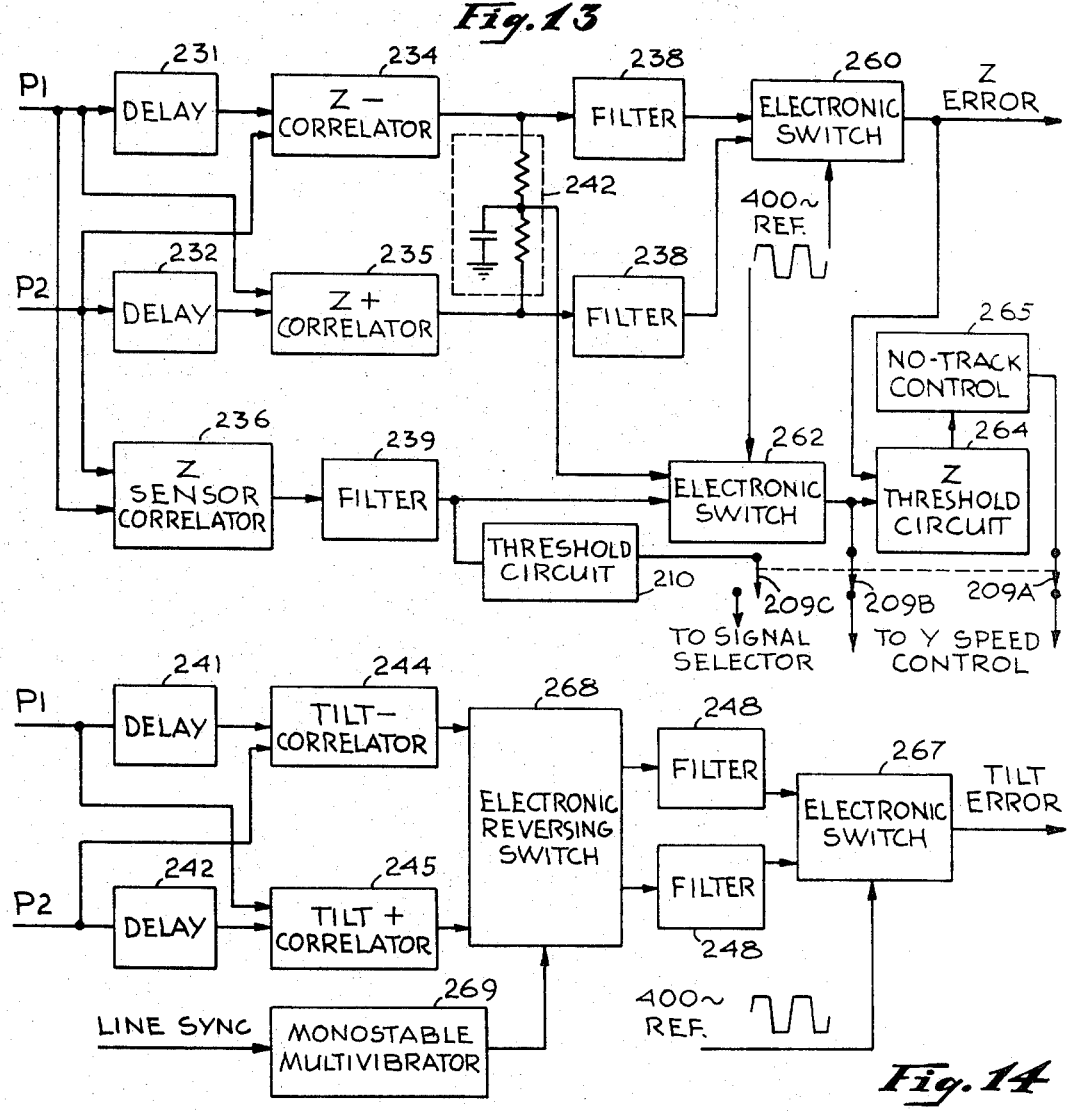
Fig. 13
Fig. 14
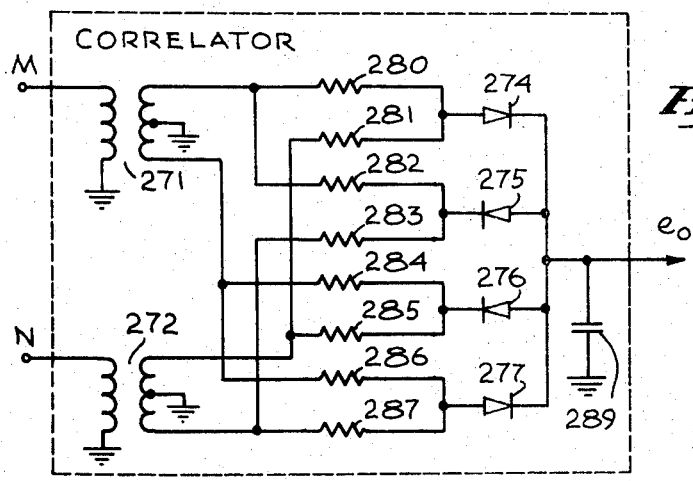
Fig. 15
WILLIAM H. COOK
INVENTOR.
BY
*Fraser and Bogucki*
ATTORNEYS

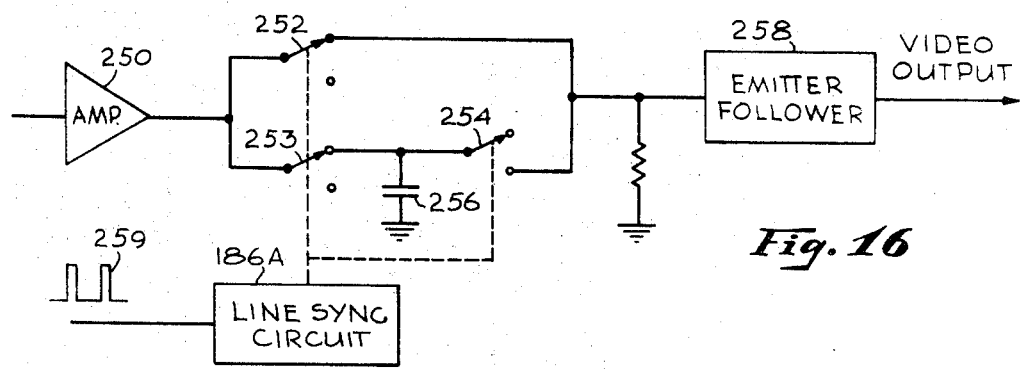
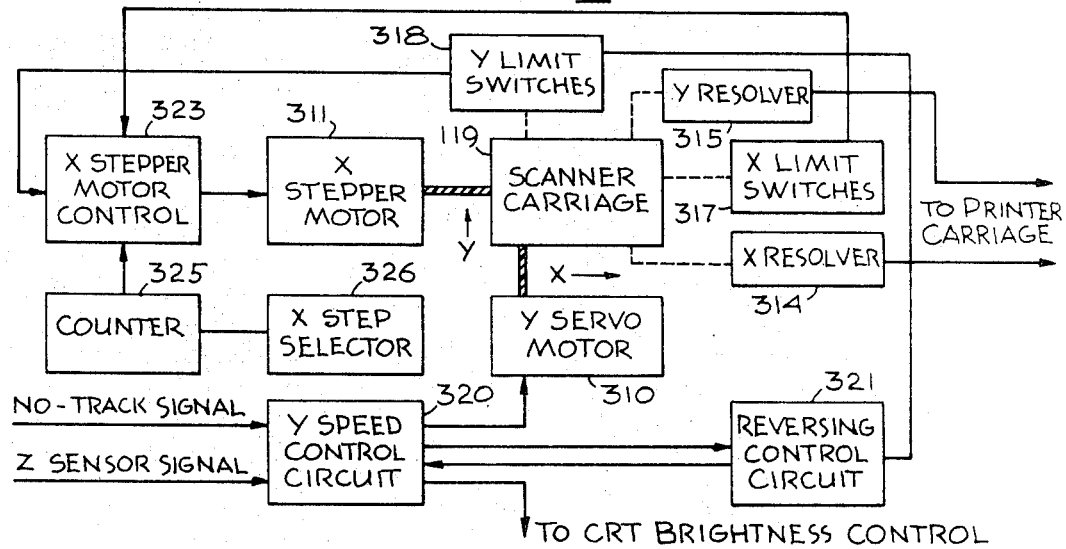
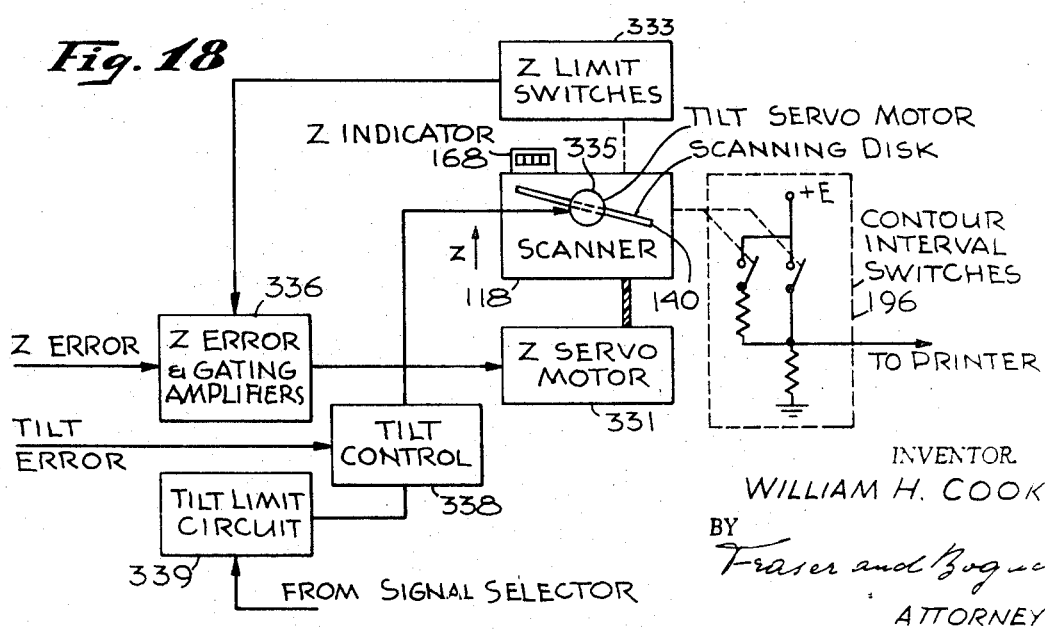

WILLIAM H. COOK
INVENTOR.

BY Fraser and Bogucki
ATTORNEYS

INVENTOR.
WILLIAM H. COOK
BY
Fraser and Bogucki
ATTORNEY

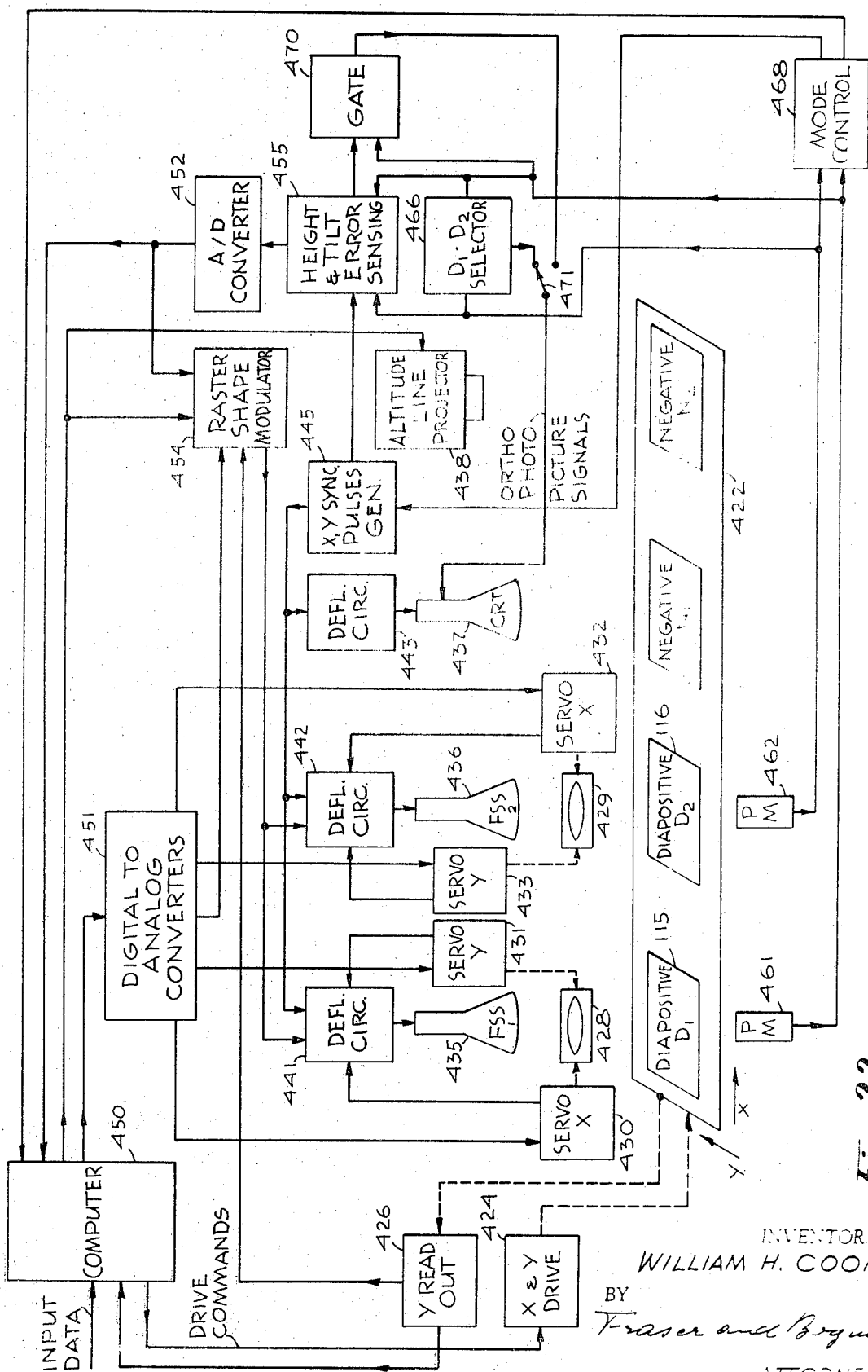

AUTOMATIC PHOTO COMPARISION SYSTEM

This application is a continuation of application Ser. No. 274,452, filed Apr. 22, 1963, now abandoned.

This invention relates to the field of photograph interpretation and, more particularly, to arrangements for automatically indicating differences between orthographic projection of photographic information for a given area as derived at different times.

Photographic interpretation may be defined, for the purpose of the present invention, as the determination of the nature and character of objects that are imaged on a photograph with the objective of detecting significant cultural changes in a given area through the use of photographs showing the area before and after the changes. One particularly important use of photographic interpretation lies in military applications where an examination of aerial photographs to spot troop activities or the construction of dock facilities, munitions factories, military bases, and the like is of interest. Such photographs are regularly obtained by aerial cameras mounted in reconnaissance aircraft flying over the area of interest. One common application of the photo interpretation procedure is the determination of cultural changes that may take place in a given area as are evidenced in changes in the photographic image taken in a "before and after" sequence.

Prior to the development of the present invention the photographic interpretation procedure was, in a practical sense, performed exclusively by human beings. The photo interpreter may use various aids in this work, such as the stereoscope or other optical viewing and measuring instruments, but the determination of significant changes in photographs taken of the same area at different times has been dependent upon the ability of human beings performing the examination. Essentially, in comparing two photographs of the same area, the photo interpreter performs two separate functions. He first compares the photographs to ascertain any cultural changes which may have taken place in the time interval between the taking of the photographs; he then applies his judgment in examining the areas of change critically to determine if the changes are of a nature which warrant further attention. That is, the presence of a herd of cattle in one photograph but not in another may not be significant, whereas the clearing of trees in an area to be occupied by a new airport or missile site may be of extreme interest. As between human operators, the different steps of a photo interpretation process outlined above may be allocated to different individuals with the second step, which requires the application of human judgment, being reserved to more experienced personnel who are qualified to apply such judgment. The first-mentioned step, however, is an extremely tedious process which requires a continuous examination of photograph after photograph in order to note the cultural changes which may have taken place in the corresponding area. The procedure at this stage is not only slow and monotonous, but is subject to human errors which commonly occur so that certain cultural changes, and particularly those which may involve the use of camouflage in order to disguise the fact that changes have been made, are likely to be overlooked. Despite this fact, there were no practical methods or apparatus for performing this function in any other manner prior to the development of the present invention.

The significance of the invention is primarily in the use of photographs produced in corresponding projection, for example, orthographic projection photographs, for the comparison process. Earlier attempts to provide an automatic change detection device relied on the use of original photographs. Since such photographs are not exposed at the same time, the geometry of the photographs to be compared is generally not identical because of changes in camera position, camera attitude, camera distortion and relief displacements due to variation in altitude of the terrain. Such deviations in geometry between photographs can be compensated for by human photo interpreters but present particular problems in automatic comparison systems. While it is possible to correct for differences in camera position and attitude through standard rectification processes, the last-mentioned factor, in particular, has heretofore not been correctable by any reasonable procedure. The result has been that attempts to determine automatically the presence of significant changes between photographs have been seriously compromised by variations between photographs in the nature of slight shifts, or local changes of scale of the imagery.

It is therefore an object of this invention to provide a system for automatically comparing photographs of a given area and for reliably indicating any changes which may exist in the respective photographs.

Another object of the present invention is to provide an automatic photo comparison system which is not subject to the omissions commonly committed by human photo interpreters.

Another object of the present invention is to provide an automatic system which is capable of performing the photo comparison process at greater speed than is attainable with human photo interpreters.

The present invention is intended as an aid to a photo interpreter. In practice it provides him with a view of the area depicting only those elemental areas that show differences between the photographs being examined. The photo interpreter may then confine his attention to the determination of the nature and significance of the changes detected by the equipment of the invention with a substantial saving in time and effort.

In brief, particular arrangements in accordance with the present invention provide for automatically scanning a pair of corresponding photographs providing images in like projection, such as a pair of orthographically projected photographs (orthophotos), or other related graphic representations of a given area, correlating the signals which are derived during the scanning process, and indicating particular portions of the area under examination which appear to have undergone cultural change. The system may be arranged to block any output signal so long as the signals derived from the scanning process provide a reasonable degree of correlation. In accordance with an aspect of the invention, a variable threshold circuit may be included to determine the degree of discorrelation which will be understood to indicate the particular cultural change which is to be detected. Upon encountering a lack of correlation between the respective scanning signals which is sufficient to trigger the threshold circuit, an output signal is provided and the signals may then be used to print out automatically a pair of photographic maps of the particular portion of the area in which change has been detected. These output photomaps are advantageously arranged to depict the portion of interest both before and after the change for direct comparison by the photo interpreter.

Particular equipment for providing orthophotos suitable for use as input information for the photo comparison system of the present invention include the Automatic Stereomapping System, disclosed in co-pending application Ser. No. 199,797, filed June 4, 1962, and the Automatic Map Compilation System, disclosed in co-pending application Ser. No. 240,638, filed Nov. 28, 1962, both by Sidney Bertram and assigned to the assignee of this invention. The advantage of such orthophotos for use in the present invention lies in the fact that they have been printed precisely to a standard scale and with all sources of distortion removed. These orthophotos can then be electronically compared with more assurance that detected changes are meaningful and should therefore be called to the attention of a human photo interpreter to determine their significance.

One specific arrangement in accordance with the invention may utilize to particular advantage the above-mentioned automatic stereomapping system not only for the generation of orthophoto maps from stereoscopic photographs but also, as modified in accordance with the invention, as a system for performing the desired automatic photo comparison. The automatic stereomapping system of the above-cited copending application utilizes automatic scanning and signal correlation techniques to analyze a pair of stereoscopic photographs to print out an orthophoto and an altitude, or drop-line, chart indicating corresponding elevations of the incremental portions of the orthophoto. In one particular arrangement of the present invention, an orthophoto thus derived is compared with a similar orthophoto to precisely the same scale of the same area taken at a different time by utilizing the scanning and correlating portions of the automatic stereomapping system. At this time, however, the elevation indicating portion of the stereomapping system may be disabled, as there is no need, and indeed no available information, for determining elevation change. A signal from the correlation circuitry is used to control the above-mentioned threshold circuit which is arranged, in accordance with an aspect of the invention, to gate the orthophoto print-out signal so that a pair of orthographic maps are printed showing only those areas in which a change is encountered.

A second particular embodiment of the invention is arranged to operate in conjunction with the apparatus of the above-mentioned automatic map compilation system. In this arrangement of the invention, analysis of a pair of stereoscopic photographs similar to that provided by the automatic stereomapping system is accomplished by automatically scanning and correlating the resultant signals under the control of a digital computer. As before, an orthophoto and an altitude chart are printed as the output of the map compilation operation. Orthophotos thus derived corresponding to photographs taken at different times are then inserted at the input point of the system and the scanning procedure is repeated for the photo comparison step. However, this particular embodiment is arranged in accordance with the present invention to provide for printing out the corresponding map information only for those points where actual changes are encountered. Furthermore, in this particular arrangement of the invention the system is not only controlled to print out an indication of the areas in which change is detected, but the respective scanning signals are directed to a difference amplifier for comparison so that the output may be used to print out maps indicating the "before" and "after" views of areas showing differences for the two orthophotos which are being scanned. Thus, there is provided not only an indication that change is detected but further an indication of the nature of the detected change.

Still another particular arrangement in accordance with the invention provides a simplified apparatus by which the desired scanning of a pair of input photographs results in the presentation of the desired indication of detected differences in the two photographs. In this arrangement, scanning of the two photographs is provided in synchronized fashion by a flying spot scanner and an optical system including a dichroic mirror to direct the scanning beam simultaneously to both of the photographs. Corresponding photo cells pick up the beams passed through the photographs and provide video signals which may be directed to particular display devices. This particular arrangement includes a gate circuit responsive to a correlation signal in excess of a predetermined threshold in order to control the application of the video signals to corresponding cathode ray tubes which are arranged to expose a pair of photographic plates. An alternative display arrangement is provided in this particular arrangement of the invention by means of an electronic switch which receives the video signals and applies them alternately to a display cathode ray tube. Such a display presents views of alternate photographs in rapid succession, with the result that any differences between the two are immediately apparent to an operator viewing the display.

Other arrangements and combinations of input information are possible in the above-mentioned arrangements of the present invention, which are indicated by a way of illustration only, and are not to be taken as limiting the invention. For example, the automatic photo comparison system of the present invention may be arranged to provide a comparison of elevation differences for a given terrain, rather than comparing the photographic appearance of particular terrain in a pair of photographs, simply by inserting at the input of the system a pair of drop-line or altitude charts instead of the aforementioned photographs. It should be particularly understood that the system of the invention is not limited to the use of orthophotos or of input photographs in the form of any particular image projection. The description of the invention in the context of the comparison of orthophotos is merely by way of illustrating one particular type of information presentation with which the system is compatible. It will be clear, however, that the system is suitable for automatic comparison of input information in any form of standard projection so long as the images are presented in corresponding projection.

A better understanding of the present invention may be had from a consideration of the following detailed description, taken in conjunction with the accompanying drawings, in which:

FIG. 4 is a sketch representing a portion of a particular orthophoto which may be produced by the stereomapping system;

FIG. 5 is a sketch representing a portion of a particular altitude or drop-line chart which may be produced by the stereomapping system in correspondence with the orthophoto of FIG. 4;

FIG. 9 is a view of a Nipkow scanning disk employed in the scanner of FIG. 6;

FIG. 11 is a diagram presented to demonstrate the method of sensing elevation error in the arrangement of FIG. 1;

FIG. 12 represents waveforms corresponding to different elevations represented in FIG. 10;

FIG. 13 is a block diagram representing a height error generating circuit which may be included in the Z-axis control portion of the arrangement of FIG. 10;

FIG. 14 is a block diagram of a particular tilt error generating circuit which may be employed as part of the tilt control portion of the arrangement of FIG. 10;

FIG. 15 is a schematic diagram of a particular correlator circuit suitable for use in the arrangements of FIGS. 13 and 14;

FIG. 16 is a schematic diagram of a dead-time compensator circuit which may be used in the arrangement shown in FIG. 10;

FIG. 17 is a block diagram showing in greater detail the scanner carriage control portion of the arrangement shown in FIG. 10;

FIG. 18 is a block diagram showing in greater detail the Z axis and tilt control portions of the arrangement of FIG. 10;

FIG. 22 is a simplified block diagram of an automatic map compilation system which may be utilized in the present invention.

The photo comparison system of the present invention provides an automatic comparison of a pair of orthographic photographs which represent particular terrain at different times and automatically provides an indication of the differences between the respective photographs. The input photographs may advantageously be provided by an automatic photogrammetric system such as the automatic stereomapping system or the automatic map compilation system of the above cited co-pending applications. Such automatic photogrammetric systems are a comparatively recent development in the art. Moreover such systems, suitably modified, may be employed to perform the desired photo comparison process in accordance with the present invention. It therefore seems worthwhile to describe in detail the arrangement and operation of the stereomapping system, both as utilized in conventional operation and as modified in accordance with the present invention for utilization as a photo comparison system.

Figure 1:
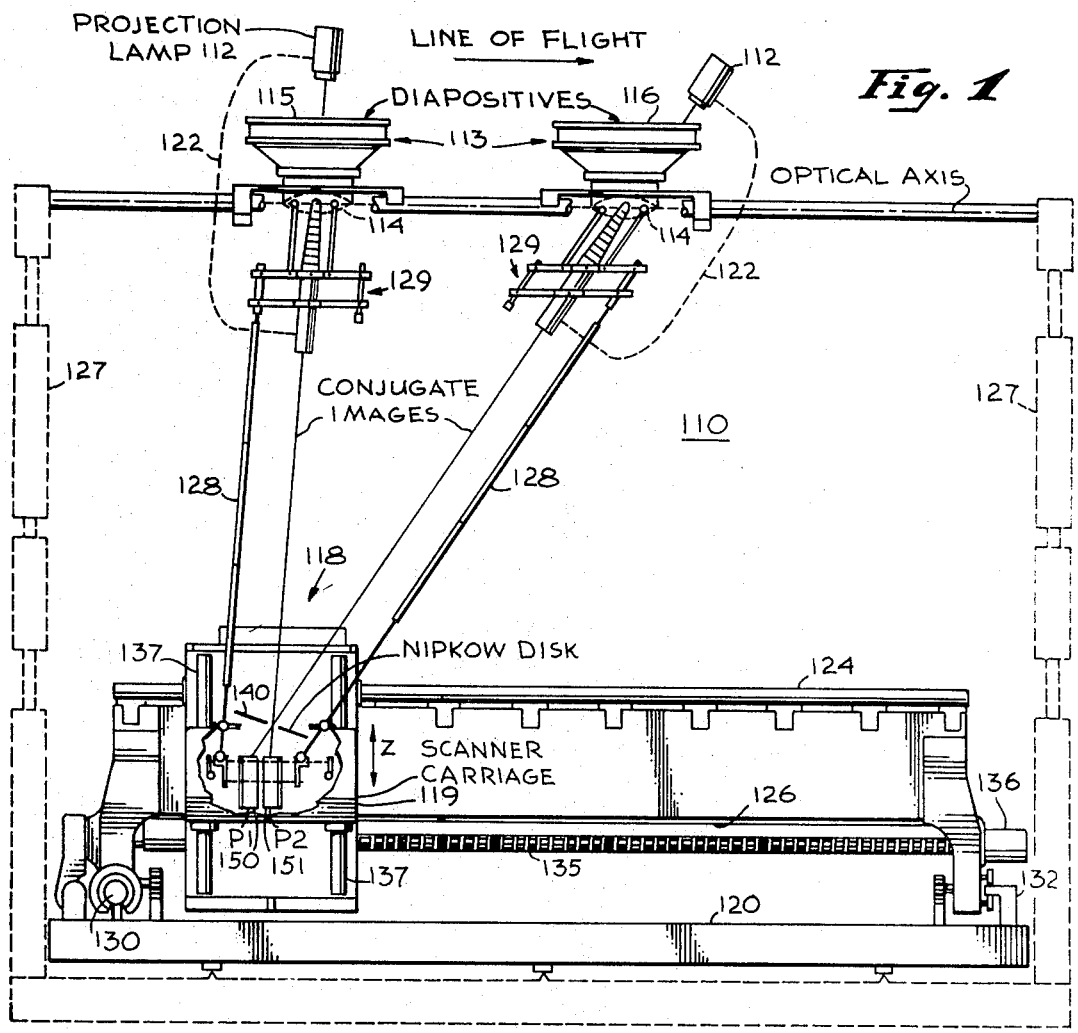
FIG. 1 is a front elevational representation of significant portions of a modified Kelsh plotter which may be employed in one particular arrangement of the present invention.
Figure 2:
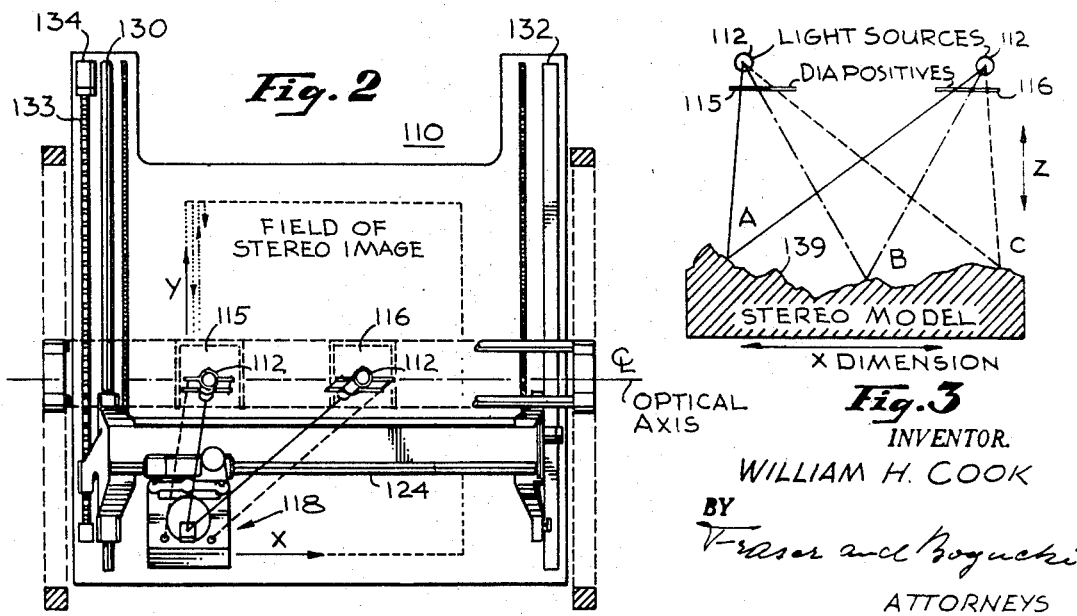
FIG. 2 is a plan view representing the modified Kelsh plotter shown in FIG. 1 and indicating the mode of traverse of the scanning mechanism.
Figure 6:
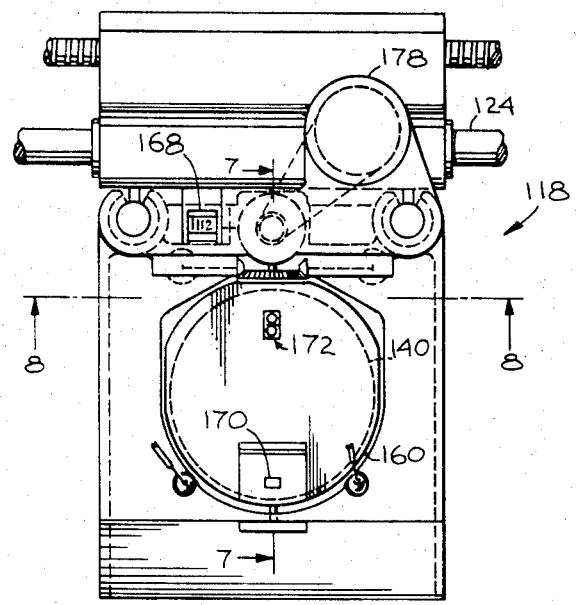
FIG. 6 is a plan view showing the scanner employed in the mechanism of FIG. 1.
Figure 7:
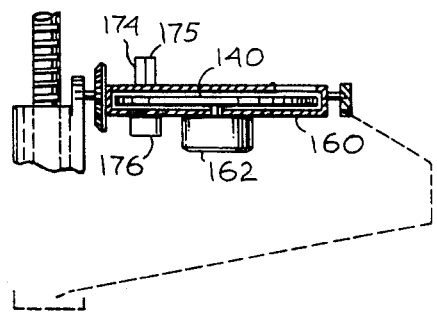
FIG. 7 is a sectional view of the scanner of FIG. 6 taken along the line 7—7.
Figure 8:
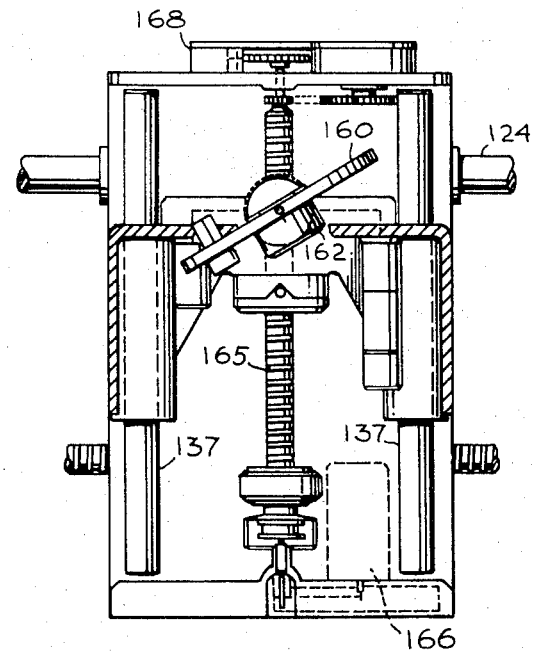
FIG. 8 is a sectional view of the scanner of FIG. 6 taken along the line 8—8.

In the arrangement shown in elevational and plan views in FIGS. 1 and 2 respectively, a Kelsh plotter 110 is depicted as modified to operate in the above-cited stereomapping system which is employed in the present invention. The modified Kelsh plotter 110 basically comprises a pair of light sources 112, light imaging mechanisms 113 including lenses 114, a pair of diapositives 115 and 116 positioned on the mechanisms 113, a scanner 118, and a base, or bed, 120 on which the entire apparatus is mounted. Support members 127 of the frame are indicated generally and may be of any suitable configuration. The scanner 118, suspended from a scanner carriage 119, is arranged to be independently movable in three dimensions by means of an X-axis guide rail 124 and corresponding way 126, Y-axis guide rail 130 and corresponding way 132, and Z-axis guide rails 137. It will be understood that the Y-axis is represented in FIG. 1 as being perpendicular to the plane of the drawing while the X-axis is horizontal and the Z-axis is vertical in plane of the drawing. Suitable suspension arms 122 for the light sources 112 are represented by dashed lines which indicate the general shape of the arms 122. These arms, together with appropriate linkage members 128 and 129, mechanically connect the scanner 118 and the light sources 112, thus causing the various portions of the mechanism to move so that light is always directed at the scanner 118 as the latter is moved over the extent of its traverse. Details of the scanner 118 are shown in FIGS. 6, 7 and 8.

In the operation of the modified Kelsh plotter of FIGS. 1 and 2, a pair of diapositives 115 and 116, corresponding to aerial photographs taken along the line of flight of an airplane, are positioned so as to develop a suitable stereo image or model within the range of the scanner 118. The motion of the scanner along its automatic traverse pattern as indicated in FIG. 2 is then initiated, whereby the scanner 118 moves back and forth along lines perpendicular to the line of flight (along the Y-axis), followed by a step over a preselected interval in the direction of the line of flight (along the X-axis) each time the limit of Y traverse is reached. This procedure continues until the entire area of the stereo image has been covered. The described motion is controlled by the Y-axis drive screw 133, driven by the Y-axis motor 134, and by the X-axis drive screw 135, driven by the X-axis stepper motor 136. While the scanner 118 is being moved in the horizontal plane in the manner described, it may also move vertically along the Z-axis to follow a profile of the stereo image.

The scanner 118 includes a Nipkow scanning disk 140 and a pair of photomultiplier tubes 150 and 151, shown in the cutaway portion of FIG. 1. The Nipkow scanning disk 140, together with its associated housing, functions as a test surface in the modified Kelsh plotter 110 and mechanically scans a small incremental area by admitting light from the light sources 112 through succeeding apertures of the Nipkow disk 140 to the photomultiplier tubes 150 and 151. Electrical signals, developed by the photomultiplier tubes 150 and 151 in response to the incident light beams, are analyzed in the system of the invention and are employed to provide video information for the printing of an orthophoto and to develop appropriate error signals for controlling the scanner 118, causing the scanner 118 to assume both the appropriate elevation and tilt corresponding to the incremental area being scanned. Electrical signals developed in accordance with the elevation or Z position of the scanner 118 are then generated to control the printing of a drop-line or altitude chart corresponding to the orthophoto which may be printed concurrently with the printing of the drop-line chart as will be seen more clearly hereinafter.

Figure 3:
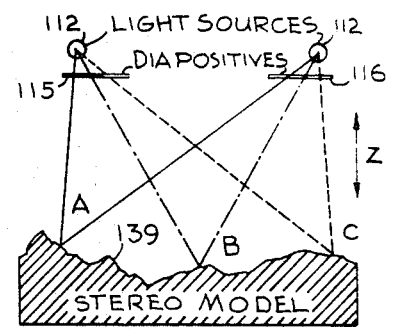
FIG. 3 is a sectional representation of a stereo model optically developed in the plotter of FIG. 1.

The simplified diagram of FIG. 3 is included to assist in the understanding of the principles upon which automatic scanning is based. This diagram portrays a section of a stereo model corresponding to a pair of diapositives 115, 116. It should be borne in mind that the stereo model referred to is simply a projected image; however, it can be most easily understood if it is thought of as an actual model having a three dimensional profile or surface. The profile is determined by the locus of points of registration of the light images projected from the two diapositives 115, 116 over the extent of their overlap. As viewed in this manner, the projected stereo image may be considered to possess a section profile 139 as indicated. This profile 139 is determined by the elevation at which focused image defining portions of the respective light beams transmitted through the diapositives 115, 116 are in registration. Thus, a point A is shown at the left-hand side of FIG. 3 having an elevation corresponding to the point of intersection of the light beams, indicated by the solid lines, which pass through portions of the diapositives 115 and 116 defining the same image detail. Similarly, the points B and C are shown at particular elevations corresponding to the intersections of the light beams, indicated by the dot-dashed and dashed lines respectively, which are directed at those points from the diapositives 115, 116. In each pair of light beams associated with images on the two diapositives from a common terrain point the intersection occurs at a height corresponding to the elevation of the terrain point. The scanning operation achieves a stereo effect by virtue of the geometrical separation of the light from the two projectors to their respective photomultipliers.

A portion of a typical orthophoto such as may be printed out in the operation of the stereomapping system is represented in FIG. 4. As may be understood from the portion of the orthophoto shown, the photographic details of the original aerial photographs as represented by the two diapositives are reproduced in the orthophoto. In fact, because of the way in which the light intensity and cathode ray tube brightness levels are controlled in the operation of the system of the invention, it is actually possible to reconstruct an orthophoto which points up photographic detail not readily discernible in the original diapositives. In addition, since the photographic detail is exposed at a film position corresponding to the actual Cartesian coordinates of the scanner 118, the new photograph appears as a true orthographic projection which depicts the respective points therein in true horizontal relationship without distortion due to the angle of viewing.

FIG. 5 depicts a portion of a drop-line chart corresponding to the orthophoto portion of FIG. 4. The section shown in detail in FIG. 5 indicates how the drop lines are depicted in a way which permits the contour lines to be readily ascertained. In the depicted chart of FIG. 5, changes in elevation are indicated by printing in three different line types as may be defined by the shades, white, gray and black, in sequence for a continuing change of elevation. The different elevation intervals are distinguished by being represented in the different shades, with each shade being repeated in sequence. Thus, if for a particular section of the chart a 900–920 foot level (for an elevation interval of 20 feet) is represented by a black line and the sequence of the respective shades occurs in the order, black-gray-white, for increasing elevation, then it is clear that an adjacent grey line represents the 920–940 foot interval while a white line adjacent the gray line representing the 920–940 foot interval represents the 940–960 foot interval. Printing in this fashion not only permits changes of elevation to be readily ascertained but also permits the direction of the elevation change (whether up or down) to be determined. With a drop-line chart and an orthophoto printed in this manner, superposition of the contour lines, which are clearly indicated as the boundaries of areas of a given altitude interval on the drop-line chart, upon the orthophoto then produces an effective topographic map.

Details of the scanner 118 are shown in the respective views thereof in FIGS. 6, 7, and 8. As shown, the scanner 118 comprises a Nipkow scanning disk 140 mounted for rotation within a housing 160. A motor 162 is attached to the housing 160 for driving the Nipkow disk 140. The entire scanning disk mechanism including the housing 160 is movable in the vertical or Z direction by means of the Z-axis drive screw 165 and the Z-axis motor 166. An indicating counter 168 is coupled to the scanner 118 to provide an indication of the scanner elevation which may be read by the operator. In addition, the Nipkow disk housing 160 is mounted so that it may be tilted about an axis parallel to the Y-axis by a servomotor responsive to tilt signals in order to provide better correspondence with the actual terrain in tilted areas of the image. Tilt control of the Nipkow disk is independent of the scanning and elevation control of the scanner, and in some applications tilt control may not be needed.

The scanning disk housing 160 is provided with two pairs of windows arranged on opposite sides of the disk 140. One pair, referred to as the scanning window 170, shown at the lower portion of the housing 160 in FIG. 6, serves to define the incremental area of the projected stereo image being scanned at any given instant. The other pair, designated the sync window 172 and shown in the upper portion of the housing 160 in FIG. 6, is used to generate line and frame sync pulses in conjunction with the Nipkow disk 140 as will be discussed more fully below. These sync pulses are developed by light from a light source 176 passing through the sync window 172 to a line sync photocell 174 and a frame sync photocell 175. As shown in FIG. 1, the light from the diapositives 115, 116 passes through the window 170 and the moving Nipkow scanning apertures in the housing 160 and is directed to the photomultipliers 151 and 150 respectively.

Signals bearing information relating to the elevation of the scanner 118 for use in the printing of the drop-line photo are developed by a contour interval readout mechanism 178 coupled to the scanner 118. Negator springs (not shown) are incorporated in the suspension mechanism of the scanner 118 to counterbalance the weight of the moving elements in order to reduce the torque demand on the Z-axis servomotor 166 when the scanner 118 is being raised.

FIG. 9 shows a Nipkow scanning disk 140 as utilized in the scanner 118. This particular scanning disk 140 includes a plurality of scanning apertures 212, a like plurality of line sync apertures 214 and a plurality of frame sync apertures 216. As shown, the line scanning apertures 212 are arranged in three groups, one group for each of the frame sync apertures 216. Within an individual group corresponding to one frame, the apertures 212 are displaced at successively smaller radial distances (proceeding clockwise) from the center of the disk. Thus, when the disk 140 is rotated counterclockwise within the disk housing 160 of the scanner 118 (FIG. 6), each scanning aperture 212 passes in turn across the scanning window 170, exposing successive lines of the frame being scanned to the photomultiplier tubes 150, 151. At the same time, light is permitted to pass through the sync window 172 and through the appropriate line sync apertures 214 and frame sync apertures 216 to the corresponding photocells 174 and 175. These photocells and suitable associated circuitry in turn generate appropriate synchronizing pulses which are employed in the processing of the video signals derived from the photomultiplier tubes 150 and 151. In this particular arrangement of the invention, the Nipkow scanning disk is arranged to rotate at 3,600 rpm. The disk has three groups of 15 line scanning apertures each so that scanning is thus achieved at a rate of 180 frames per second and 2,700 lines per second with a resolution of 15 lines per frame. The scanning window area is 0.335 inch in the X-dimension by 0.092 inch in the Y-dimension.

Figure 10:
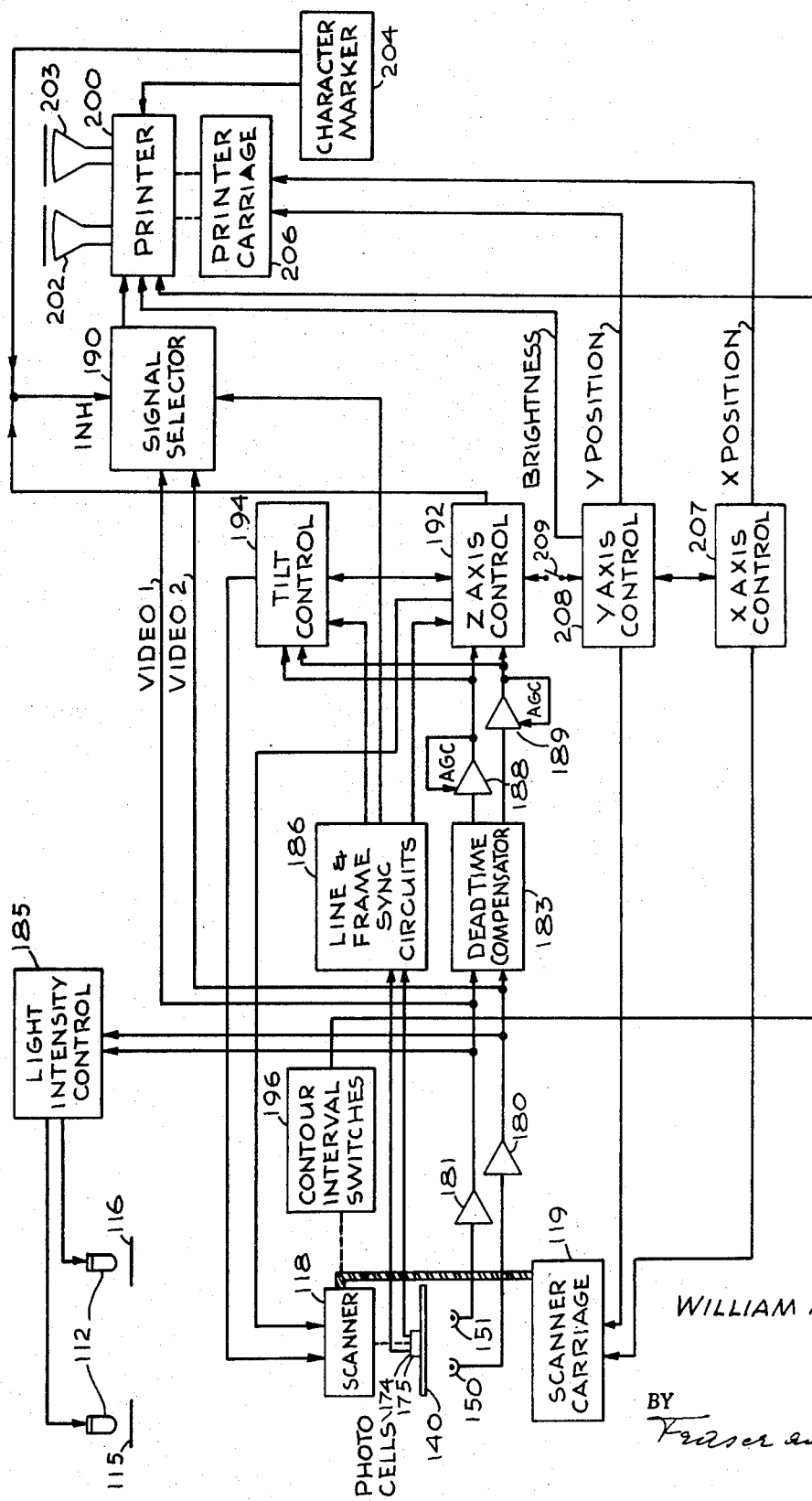
FIG. 10 is a simplified block diagram of the stereomapping system including the plotter shown in FIG. 1.

A simplified diagram of the stereomapping system is shown in FIG. 10. In this figure a pair of light sources 112 is shown in conjunction with a pair of diapositives 115 and 116, a scanner 118 having a scanning disk 140, a pair of photocells 174 and 175, and a pair of photomultipliers 150 and 151. As indicated in FIG. 1, the scanner 118 is mounted on a scanner carriage 119 arranged for controlling the motion of the scanner 118 in the X- and Y-directions. The photomultipliers 150 and 151 are coupled respectively via amplifiers 180 and 181 to a dead-time compensator 183 and to a signal selector 190. In addition, the output terminals of the amplifiers 180 and 181 are coupled to a light intensity control stage 185 to complete a feedback loop for the control of the intensity of the light sources 112. The photocells 174, 175 are coupled to line and frame sync circuits 186 which in turn are coupled to the dead-time compensator 183 and to various other portions of the system for controlling the processing of the video information derived from the photomultipliers 150, 151 in accordance with the sync pulses generated by the photocells 174 and 175. From the output of the dead-time compensator 183, dual channels of video signals are coupled via automatic gain controlled amplifiers 188 and 189 to a Z-axis control stage 192. Signals are also directed from the output of the amplifiers 188, 189 to a tilt control stage 194 which controls the tilt of the disk 140 in the scanner 118.

In a manner to be described, the better of the two video signals is selected by the signal selector 190 and passed from the signal selector to a printer 200 which includes a pair of cathode ray tubes respectively. The drop-line chart is printed in response to signals received by the printer 200 from a group of contour interval switches 196 coupled to the scanner 118. A character marker 204 is coupled to the printer 200 for generating appropriate character signals to designate particular points on the print-out photos as desired. The printer 200 is affixed to a printer carriage 206 which, together with the scanner carriage 119, is positioned in accordance with signals from an X-axis control stage 207 and a Y-axis control stage 208.

In the automatic operation of the system of FIG. 10, the operator first establishes an accurate stereo model by appropriate adjustment of the light imaging mechanisms 113 (FIG. 1) to bring into registration known bench marks positioned on the respective diapositives 115, 116 and also positions the carriage at the desired starting point. In addition to positioning the scanner carriage 119 at the initial X- and Y-coordinate points, the Z-carriage is adjusted to the corresponding altitude of the stereo image at the starting point and the system is placed in automatic operation. In the automatic operating mode, the scanner carriage 119 traverses across the image in the Y-direction and steps by a preselected distance in the X-direction at the end of each traverse as indicated in FIG. 2.

In this mode of operation, the overlapping portions of the projected images from the two diapositives 115, 116 are scanned simultaneously to provide corresponding electrical signals that are representative of the terrain. The scanning is accomplished mechanically using the Nipkow disk 140. The electrical signals which are obtained from the photomultipliers 150, 151 are analyzed in the Z-axis control stage 192 for the time coincidence of correlated elements in order to determine the error or deviation from true image elevation in the elevation of the scanner 118. The resulting error signal is fed back from the Z-axis control stage 192 and is used to raise or lower the scanner 118 together with its Nipkow disk 140. This portion of the system therefore forms a closed loop altitude servo mechanism. Correlation signals from the Z-axis control stage 192 are also applied to the signal selector 190 to control print-out in the photo interpretation mode of operation.

A simple demonstration of the way in which signals from the photomultiplier tubes 150 and 151 may be analyzed to develop a corresponding height error signal is made by reference to FIGS. 11 and 12. FIG. 11 is a simplified schematic diagram showing respective light beams from the light sources 112 passing through the diapositives 115 and 116 to intersect at a point P, the X, Y, and Z coordinates of which model the position of the point in the terrain of the photographs. After intersecting at the point P, the light beams continue to the photomultiplier tubes 150 and 151, designated P1 and P2 respectively. First assume that an apertured mask 140' representing the Nipkow disk 140 is in position to scan the image at the correct altitude as indicated by the dashed line C; that is, the Nipkow scanning disk is at an elevation corresponding to the image contour at the point P. When a scanning aperture is at the point P, both beams of light pass through the disk aperture to the corresponding photomultipliers 150, 151 simultaneously with the result that the electrical signals developed by the photomultiplier tubes 150, 151 are coincident in time as shown by the simplified waveforms designated A in FIG. 12. If the Nipkow scanning disk is moved to the dashed line H, the disk is too high and the light beam from the diapositive 115 passes through to the photomultiplier 151 before the corresponding beam from the diapositive 116 passes through to the photomultiplier 150 (assuming that scanning proceeds from left to right in FIG. 11). The result is a pair of waveforms having the same general shape but displaced in time relationship in the manner of the waveforms B of FIG. 12. On the other hand, should the scanning disk be too low, as indicated by the dashed line L, the light beam from the diapositive 116 passes to the photomultiplier 150 before the corresponding light from the diapositive 115 passes to the photomultiplier 151 so that the waveforms displaced in the manner of the waveforms C of FIG. 12 are developed. The polarity and magnitude of the delay between the respective signals developed by the height error 150 and 151 provides a measure of the height error of the scanning disk 140. While the signals are not in general so well defined as the pulses shown in FIG. 12, it is still possible to consider that they are in time coincidence or that one is early with respect to the other on the basic of examining corresponding similar elements on the signals. If the signals are in time coincidence the altitude is correct; if the signals are not precisely in phase, the elevation of the scanning disk is adjusted in accordance with the resulting error signal.

The portion of the Z-axis control stage 192 of FIG. 10 which develops the height error signal together with certain other control signals in response to video signals received from the photomultipliers 150 and 151 may be seen in greater detail in the block diagram of FIG. 13. In this figure, a pair of delay networks 231 and 232 are arranged together with a Z− correlator 234 and a Z+ correlator 235 to receive signals from the respective photomultiplier tubes designated P1 and P2. As shown, each of the photomultiplier signals is fed directly to one of the Z correlators and through a delay network to the other Z correlator. Thus each correlator used for height sensing receives video signals from both photomultipliers with one signal being delayed to one correlator and the other being delayed to the second correlator. Since the correlators 234, 235 each operate to provide an output signal that is maximum when the two input signals are in time coincidence, the output signal from one Z correlator increases in output as the scanning moves up from the model surface while the output signal from the other correlator decreases. The output signals from the two Z correlators 234, 235 are applied through individual filtering networks 238 to an electronic switch 260 where they are sampled sequentially at a rate synchronized with the frequency of the servo motor power source (shown in this case to be 400 cycles per second). The output of the switch 260 is a Z or height error signal of appropriate magnitude and polarity for the Z-axis control of the scanner 118. In the sampling of the signals from the filters 238, the two signals, one positive and one negative, are alternately connected at a 400 cycle rate to the Z error output lead in a manner which automatically combines the signals in a manner which preserves the polarity of the difference between them. In this manner each signal from a filter 238 serves as a reference for the other signal so that no other reference is required.

The time delay introduced by the respective delay stages 231 and 232 is designed to be a particular function of the scanning rate and the image detail being correlated. If the time delay is too short inadequate error signals are developed in response to significant deviations of the scanning elevation whereas if the time delay is too great, the correlation between the original and the delayed signals is insufficient to develop satisfactory error signals.

In the stereomapping system described herein, wherein different time delays are provided for signals which are used with multiplying correlators to develop an error signal related to time displacements between corresponding elements of two separate input signals, the optimum delay is a function of the nature of the signal and of the purpose for which it is employed. Therefore, a particular time delay is provided at the input stages to the correlators of the error signal generator which is specifically related to the scanning rate provided by the Nipkow disk and the image detail to which the system is intended to respond.

The output of a correlator such as is shown in FIG. 15 may be considered as a function of the time displacement between the two input signals. The effective limit of resolution of the image scanned by the Nipkow scanning disk is related to the width of the scanning apertures in the direction of the scan. It has been found that the useful limit of resolution occurs for image detail which is approximately equal to the aperture width. As a particular scanning aperture moves across an increment of the image having fine photographic detail approaching the effective limit of resolution, each associated photomultiplier produces a signal roughly triangular in shape having a peak located at the point of maximum alignment with the scanning aperture and having a time duration greater than the time actually required to scan the particular image detail by approximately twice the time required for the aperture to move across its width. If the particular image detail is at the effective limit of resolution of the scanner, that is, if the detail has a lateral dimension approximately equal to the width of the scanning aperture, the time duration of the pulse produced by the associated photomultiplier is approximately equal to the time required for the scanning aperture to move a distance equal to three times its own width.

When two such signals are applied to a correlator, a useful output signal is produced only when there is some degree of overlap between the two input signals. If one of the input signals is to be delayed by some time interval, the time delay should be such that the signal overlap is not entirely eliminated. The optimum time delay to be provided for the differential correlators, such as are shown in FIGS. 13 and 14, is in the range of two to three times the time required for a scanning aperture to move the distance equal to its width. This time delay is optimized in accordance with a maximum resolution of image detail to which the system is desired to respond in order to achieve a suitable compromise between maximum sensitivity to scanner elevation errors and maximum range over which the system can respond to such error. For the particular scanner employed, time delays of 20 microseconds are provided which represent a value of 2½ times the time required for an aperture to move its own width with a Nipkow scanning disk having apertures 0.008 inch in diameter spaced at a mean radius of 2.6 inches from the center and rotating at 60 revolutions per second for a resultant scanning velocity of 980 inches per second.

An RC network 242 is connected across the output terminals of the Z correlators 234 and 235 in order to develop a signal which is an average of the output signals from the correlators 234 and 235. Concurrently the signals from the two photomultiplier tubes P1 and P2 are also fed directly (without delay) to a Z sensor correlator 236 which compares the undelayed signals and develops a large output signal when the correlation is good, providing there are reasonably good signals from both photomultipliers. The output signal from the Z sensor correlator 236 is filtered in a filter stage 239 and then applied to the electronic switch 262 where it is sampled periodically with the signal from the RC network 242 to provide a 400 cycle per second signal for Y speed control so that the profiling operation may be slowed down automatically when the correlation level becomes marginal. The output signal from the electronic switch 262 is also applied, along with the Z error signal from the electronic switch 260, to a Z threshold circuit 264 which energizes a no-track control stage 265 to stop the profiling operation if the correlation level falls below a predetermined threshold, thus indicating that the terrain signals are not adequate for automatic profiling or, alternatively, if the Z error signal becomes too large, thus indicating that the scanner has lost the image contour. A no-track signal is developed in the event of either of these marginal conditions and used to energize a signaling device to call the attention of the operator to the fact that automatic tracking has been interrupted. The speed control and no-track signals are applied through normally closed switches 209A and 209B. These switches are mechanically coupled to a normally open switch 209C. The purpose of these switches and the associated difference threshold circuit will be explained hereinbelow.

As already mentioned, the Nipkow scanning disk 140 is capable of rotation about an axis parallel to the Y-axis in order to more nearly conform with the terrain in sloped areas. By tilting the scanning disk 140 in this manner, a better signal-to-noise ratio is developed for the correlation output signals and the parallax interference which would otherwise be present in sloping terrain is advantageously eliminated or at least minimized. Signals to drive the tilt control circuitry 194 are also obtained from the scanning operation. In effect, the scanned line is divided at the center of the scan and signals for the two halves are examined independently to determine individual height error signals which are then compared to ascertain the tilt error. The tilt error signal thus developed from the two halves of the scan is used to drive the tilt control circuit 194 (FIG. 10). The tilt error signal is developed by circuitry which is similar to that used for altitude sensing.

A block diagram of the tilt control circuit 194 is shown in FIG. 14. As in the circuit of FIG. 13, signals from each of the photomultipliers P1, P2 are directed through paths comprising the delay lines 241 and 242 to correlators 244 and 245 where they are compared with undelayed signals fed directly to the correlators from the other photomultiplier. The correlator output signals are then directed to an electronic reversing switch 268 which is a monostable multivibrator 269 triggered by line sync pulses from the line sync portion of the sync circuits 186. Under the control of the monostable multivibrator 269 the connections between the input and output terminals of the electronic switch 268 are reversed at the midpoint of each line scan. The dual output signals from the electronic switch 268 are then applied via separate filters 248 to an electronic switch 267 where synchronous sampling of the input signals at a 400 cycle per second rate is accomplished in a manner similar to that described with respect to the development of the Z error signal in the circuit of FIG. 13. The circuit of FIG. 14 thus provides a comparison between height error signals developed for different halves of each line scan. If the error signals are equal, the indication is a constant altitude error which means no tilt correction is needed. If, however, one-half of the line scan shows a larger altitude error than the other, the result is an indication of improper tilt, in the form of a tilt error signal at the output of the switch 267 which is directed to the tilt servomotor (FIG. 18) to change the tilt of the Nipkow disk 140.

A particular circuit which may be employed to serve as a correlator in the arrangement of FIGS. 13 and 14 is represented schematically in FIG. 15. The correlator circuit of FIG. 15 comprises a pair of transformers 271 and 272 coupled to receive input signals represented as M and N. The output windings of the transformers 271, 272 are coupled to resistors 280–287, connected as shown, which in turn are coupled to diodes 274–277. An output signal is derived from a common connection of the diodes 274–277 across a capacitor 289.

In the described stereomapping system signal correlation is extremely important for suitable automatic control of scanner position, and particularly advantageous results are obtained through the use of the multiplying correlator represented in FIG. 15. The diodes 273–277, together with the resistors 280–287, provide an approximation to a square law current-voltage relationship. The two transformers 271, 272 are used to make available both polarities of the two input signals M and N. The output voltage $e_o$ across the capacitor 289 can be written $$e_o = \frac{K}{RC} \int_0^T [(M+N)^2 - (M-N)^2] dt, \qquad (1)$$

where $K$ is an arbitrary constant of proportionality, $R$ is the resistance of one of the resistors 280–287 and $C$ is the capacitance of the capacitor 289. Here $M + N$ is supplied through the diode 274 if $M + N > 0$, and through the diode 277 if $M + N < 0$. Similarly, $M - N$ is supplied through diode 275 if $M - N > 0$, and through diode 276 if $M - N < 0$. Diodes 275 and 276 are reversed in polarity to effect the subtractions. Equation (1) simplifies to $$e_o = \frac{4K}{RC} \int_0^T MN \, dt \qquad (2)$$

so that the output voltage is a measure of the average product of the two signals and, hence, of the degree of correlation between them. For example, if $M + N$ are oscillating signals of random characteristics, the product will have many positive and negative contributions and, hence, a low average; whereas if $M + N$ are identical, the instantaneous products are always positive and, hence, form a non-canceling sequence. The desired integral represented by Equations (1) and (2) is only approximated with the simple circuit shown in FIG. 15, but the depicted circuit is quite effective as a means of detecting signal correlation.

Operation of the Nipkow disk 140 is such that there is a dead-time between successive line scans. That is, the successive movement of scanning apertures across the scanned frame precludes a smooth transition from one line scan to the next. If the spacing of the scanning apertures is arranged to provide an overlap, there is a considerable increase in the intensity of the light received by the photomultipliers 150 and 151 as one scanning aperture leaves the frame and the next scanning aperture enters. Conversely, if a gap between successive line scans is provided, the light is momentarily shut out as the scan shifts from one line scanning aperture to the next. If the resultant dead time between successive line scans were not compensated, it would result in a large extraneous transient in the video signals which would reduce the effectiveness of the correlators. The dead-time compensator 183 is arranged to provide the desired compensation. The details of the operation of the dead-time compensator 183 can be seen in the diagram of FIG. 16, which shows the arrangement of the compensator for one of the photomultiplier channels.

In the circuit of FIG. 16 three switches, designated 252, 253, and 254, are controlled by the line sync circuit 186A which is triggered by line sync pulses 259. Video signals from a preamplifier 180 or 181 enter as an input to the amplifier 250 and leave as video output signals from the emitter follower 258. During a line scan the switches 252, 253 and 254 are in the position shown. Thus the video signals are passed through the circuit of FIG. 16 and at the same time a capacitor 256 is charged to an average level of the video signals. Just before the end of a line scan, a line sync pulse 259 is generated by the line sync photocell 174. The line sync circuit 186A then operates to change the position of all three switches 252-254, disconnecting the input video signal from the output and from the holding capacitor 256 while connecting the holding capacitor 256 to the output side of the circuit. The holding operation provided in this manner results in a blanking interval level which is not significantly different from the normal signal. This operation is particularly important in bright areas of the imagery where otherwise the dark signal at the end of the trace (in the absence of overlap of the scanning apertures) would be very disturbing.

The light intensity control circuitry 185 shown in FIG. 10 is arranged to ensure a reasonable signal to the video analysis circuitry despite deficiencies in quality of the diapositives. In areas of low transmission, the projection light sources 112 are brightened in intensity, thereby increasing the chance that the useful signal will be above the noise level. In areas of high transmission, the light output is reduced in order to increase the life of the projection light sources 112. The light intensity control circuit 185 comprises a pair of magnetic amplifiers, one for each light 112, which are controlled by signals from the photomultiplier amplifiers 180 and 181 in an arrangement which completes the feedback path and provides a closed loop servo control for the lights 112. By means of this arrangement, the intensity of the lights 112 is varied so that the average level of the signals present at the output of the amplifiers 180 and 181 is held constant within the limits of the light intensity control circuitry 185. The light control circuitry may also be utilized to provide a constant light level for the different portions of the image so that the light intensity does not drop off at the corners of the image field as a result of the greater distance of the scanner from the light sources. The maximum brightness of the lights 112 is limited in order that the life of the projection lights is not unduly shortened. A light control potentiometer is also provided so that the brightness of the lights 112 may be controlled manually if desired.

The X-axis control circuit 207 and the Y-axis control circuit 208 serve to drive the scanning carriage 119 in the X- and Y-directions and also provide signals which control similar positioning mechanisms for the printer carriage 206. Details of this particular portion of the system of FIG. 10 may be found in FIG. 17 which shows the scanner carriage 119 arranged for motion in the Y-direction under the control of a Y servomotor 310 and in the X-direction under control of an X stepper motor 311. The scanner carriage 119 is mechanically coupled to an X resolver 314 and Y resolver 315 which comprise synchro transmitters arranged to develop control signals for application to corresponding servomotors in the printer carriage 206 to control the position thereof in accordance with the position of the scanner carriage 119. X and Y limit switches 317 and 318 respectively are also mechanically coupled to the scanner carriage 119 to disable the drive mechanism whenever the limit of traverse in a particular direction is reached.

The Y servomotor 310 is driven by a control signal from a Y speed control circuit 320, which is coupled to receive signals from a reversing control circuit 321 and from the sensor correlator 236 and the no-track control stage 265 of FIG. 13. The X stepper motor 311 is driven in response to signals received from an X stepper motor control stage 323. A counter 325 is coupled to energize the X stepper motor control circuit 323 in accordance with the setting of an X step selector 326.

In the operation of the arrangement of FIG. 17, a particular X increment is set in the X step selector 326 and the Y speed control circuitry 320 is set to traverse in the automatic mode. Thereupon the Y servomotor 310 drives the scanner carriage 119 across the field of the stereo image in the Y-direction. When a limit of Y traverse is reached, a particular Y limit switch 318 applies signals to the X servomotor control circuit 323 and to the reversing control circuit 321. The X servomotor control circuit 323 then proceeds to energize the X stepper motor 311 by generating pulses at a predetermined rate. These pulses are counted by the counter 325 which disables the X servomotor control stage 323 when the count reaches the setting of X step selector 326.

The signal applied from the Y limit switch 318 to the reversing control circuit 321 initiates the operation of the reversing circuit. Once activated, the reversing control circuit 321 follows a predetermined sequence of operation. The circuit 321 first applies a reduced drive voltage in the forward direction to the Y speed control circuit 320 for a brief interval, during which time the scanner carriage slows down. Next, a drive voltage of the opposite polarity is applied to the Y speed control circuit 320 which reduces the velocity of the scanner carriage 119 to zero and then causes it to accelerate to normal velocity in the reverse direction. In this manner, the time required for the scanner carriage 119 to decelerate is made substantially equal to the time required for the scanner carriage to accelerate to normal speed when its direction of travel is reversed.

Should the automatic tracking proceed normally, the scanner carriage 119 continues to move back and forth at the normal rate in the manner described. However, if a Z sensor signal indicating a poor degree of correlation in the signals from the photomultipliers is received by the Y speed control circuit 320 from the Z sensor correlator 236 via switch 262 of FIG. 13, the speed of the Y servomotor 310 is reduced by virtue of the control provided by the Y speed control circuit 320 so that suitable scanning information may be derived at a slower rate. Should the Z threshold circuit 264 of FIG. 13 determine, in response to its applied input signals, that either the degree of correlation is inadequate or the Z error is too great, a signal is received from the no-track control circuit 265 which causes the Y speed control circuit 320 to interrupt the traverse of field of the stereo model by the scanner carriage 119. Under such circumstances, a warning signal is provided as an indication that tracking has been interrupted. During the changes in the speed of the movement of the scanner carriage 119, the Y speed control circuit 320 provides a signal which is applied to the cathode ray tube brightness control in the printer 200 to adjust the brightness in accordance with the velocity of the scanner carriage 119 so that the shades printed out in the orthophoto and drop-line chart are unaffected by variations of velocity of the scanner carriage 119.

A portion of the particular arrangement shown in FIG. 10 having to do with the height and tilt control of the scanner 118 is shown in somewhat greater detail in the block diagram of FIG. 18. In FIG. 18 the scanner 118 is represented as mechanically coupled to the Z servomotor 331, the Z limit switches 333, and the contour interval switches 196. The scanning disk 140 is mounted on the scanner 118 and arranged for tilting about an axis parallel to the Y-axis by means of a tilt servomotor 335. A Z error and gating amplifier 336 is coupled to receive a Z error signal (FIG. 13) and control the Z servomotor 331 in response thereto. A tilt control stage 338 is connected to receive tilt error signals and to drive the tilt servomotor 335 in accordance with these signals so long as they are not blocked by tilt limit levels applied from the tilt limit circuit 339.

The Z error signals as developed in the Z error generator shown in FIG. 13 are in the form of 400 cycle pulses synchronized with the frequency of the servomotor power source. The Z error signal is either in phase or out of phase with the power source frequency and has a magnitude which is related to the degree of deviation of the height of the scanning disk 140 from the elevation of the incremental area of the image being scanned. As amplified in the amplifier 336, the Z error signal thus serves to energize the Z servomotor 331 to drive the scanner 118 either up or down toward the proper elevation. As the scanner 118 changes elevation, the contour interval switches 196 are driven in a rotary sequence to develop an output signal indicative of scanner height which is applied to the printer 200 to control the printing of the drop-line chart. In the circuit shown in connection with the contour interval switches 196, it can be seen that three different levels of output signal are produced for the three different states of the switches, namely, either both open, one closed, or both closed. For the circuit shown, the contour interval signal has the three values of ground potential +E, or some potential midway between the two. As has already been described, this arrangement of the invention results in white, gray or black coding on the drop-line chart in correspondence with changes in elevation of the scanner 118. The use of a rotary sequence code in this fashion provides the desired information as to the direction of elevation change in addition to indicating the occurrence of a change between selected intervals of elevation.

The scanning disk 140 is arranged to be tilted by the tilt servomotor 335 to conform to the slope of the terrain of the image in order that a better correlation between the signals from the photomultiplier tubes may be obtained, thus enhancing the derived Z error signals. However, the use of the Nipkow disk 140 as the mechanical scanning mechanism for altitude sensing imposes a limitation on the useful range over which the terrain slope can be followed by tilting the Nipkow disk. If the projected image at the Nipkow disk is incident at a greater angle than 65° to the normal, very little light can go through the disk apertures to the photomultipliers 150, 151, because of interference from the edges of the disk window. Conformity to the slope of the terrain is therefore a matter of compromise; correlation is improved by tilting the scanning disk 140, provided that the image is not blocked. In practice this means that the tilt of the scanning disk 140 must be limited to some maximum value which is dependent upon the position of the scanner 118 in the stereo area. At the extreme edges of the stereo model, the maximum allowable tilt in one direction is clearly less than that which is permissible at the center of the model. The maximum allowable tilt in a given direction also varies considerably from one edge of the model to the other. In the specific stereomapping arrangement described herein, the maximum allowable tilt at the edges of the stereo model is about 25° in the direction increasing the angle of incidence of the light from the more distant projector. An arrangement is provided which utilizes signals indicative of the X-coordinate position of the scanning carriage 119 to limit the permissible tilt of the Nipkow scanning disk 140. The way in which the limit signals are developed will be discussed in connection with the description of FIG. 19 which includes a circuit developing these position signals. An additional limitation on the tilt of the scanning disk 140 is imposed by virtue of the mechanical configuration of the housing of the scanner 118 and the clearance afforded at the limits of travel of the scanner 118. Whenever the tilt limit of the scanning disk 140 for any position of the scanner 118 is reached, the tilt limit circuit 339 applies a disabling signal to the tilt control 338 which blocks any error signal tending to increase the tilt beyond the limit. However, the circuit 339 is arranged to permit tilt error signals which would decrease the tilt angle of the scanning disk 140 to be passed to the tilt servomotor 335. Thus maximum utilization of the tilt error signals is achieved within the tilt limits actually imposed.

Figure 19:
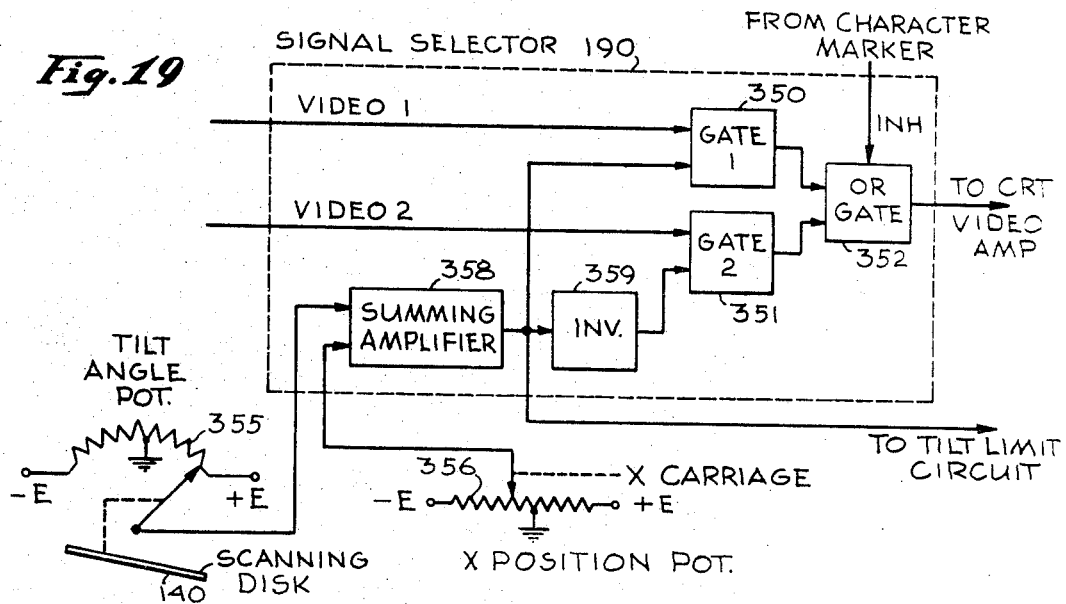
FIG. 19 is a block diagram representing details of the signal selector portion of the arrangement of FIG. 10.

FIG. 19 is a more detailed diagram of the signal selector 190 and also shows the circuitry used for developing a composite signal indicating the scanner position and tilt for application to the tilt limit circuit of FIG. 18 and for controlling the signal selector 190. The signal selector 190 is shown in FIG. 19 comprising a pair of AND-gates 350 and 351 coupled to receive the respective video signals from the photomultipliers 150, 151 and to select the better of these two signals for application to the orthophoto cathode ray tube video amplifier in the printer 200 through an OR-gate 352. The selection of the better video signal by the gates 350 and 351 is controlled in accordance with the angle of tilt of the scanning disk 140 and the X-position of the scanner carriage 119. A tilt angle sensor shown as a potentiometer 355 is arranged with its wiper mechanically coupled to the scanning disk 140 so that it follows the existing tilt of the scanning disk 140. The potentiometer 355 is connected between +E and −E with a center tap connected to the ground. A similar potentiometer 356 is connected in like fashion to provide a signal corresponding to the X-position of the scanner carriage 119. The wiper of the potentiometer 356 is mechanically coupled to the carriage 119 and movable therewith. The signals picked off by the wipers of the respective potentiometers are applied to a summing amplifier 358 which develops an output signal that is a composite of the two input signals derived from the potentiometers 355 and 356. The composite signal is applied to the tilt limit circuit 339 of FIG. 18 so that when the tilt angle becomes excessive for a particular scanner position, the tilt error signals tending to increase tilt beyond that amount may be blocked as already described. The signal from the output of the summing amplifier 358 is applied directly as a second input to the AND-gate 350 and is inverted in the inverter stage 359 and then applied as a second input to the AND-gate 351.

The operation of the signal selector 190 is such that a particular video signal is selected from the video channel which is scanning most perpendicularly to the projected light. In other words, the particular video signal selected is that corresponding to the image originating in the projector which is closer to a line drawn perpendicular to the scanning disk 140 through the scanning window. Thus, for example, if the angle of tilt is zero, the signal selector 190 shifts from one video signal to the other video signal at the midpoint of traverse of the carriage 119 in the X-direction. Similarly, if the carriage 119 is located at the midpoint in the X-direction, a shift between video signals occurs as the tilt of the scanning disk 140 passes through zero. Other combinations of X-position and tilt angle determine the selection of the preferred video signal in accordance with the polarity of the composite signal from the summing amplifier 358. In the arrangement shown, a positive output signal from a summing amplifier 358 serves to turn on the AND-gate 350 and, because of the signal inversion by the inverter 359, serves to cut off the AND-gate 351. Conversely, when the output of the summing amplifier 358 is negative, the gate 350 is turned off and the gate 351 is turned on. Thus either video signal No. 1 or video signal No. 2 is available at the input of the OR-gate 352 and in normal operation is applied to the printer 200. The OR-gate 352 is connected to receive an inhibiting signal from the character marker 204 (see FIG. 10) so that video signals may be blocked from the printer 200 when the character marker 204 is being operated. Such an inhibiting signal is also provided from the threshold circuit 210 via switch 209C, when closed (see FIG. 13), during the photo comparison operation except when significant change is detected.

Figure 20:
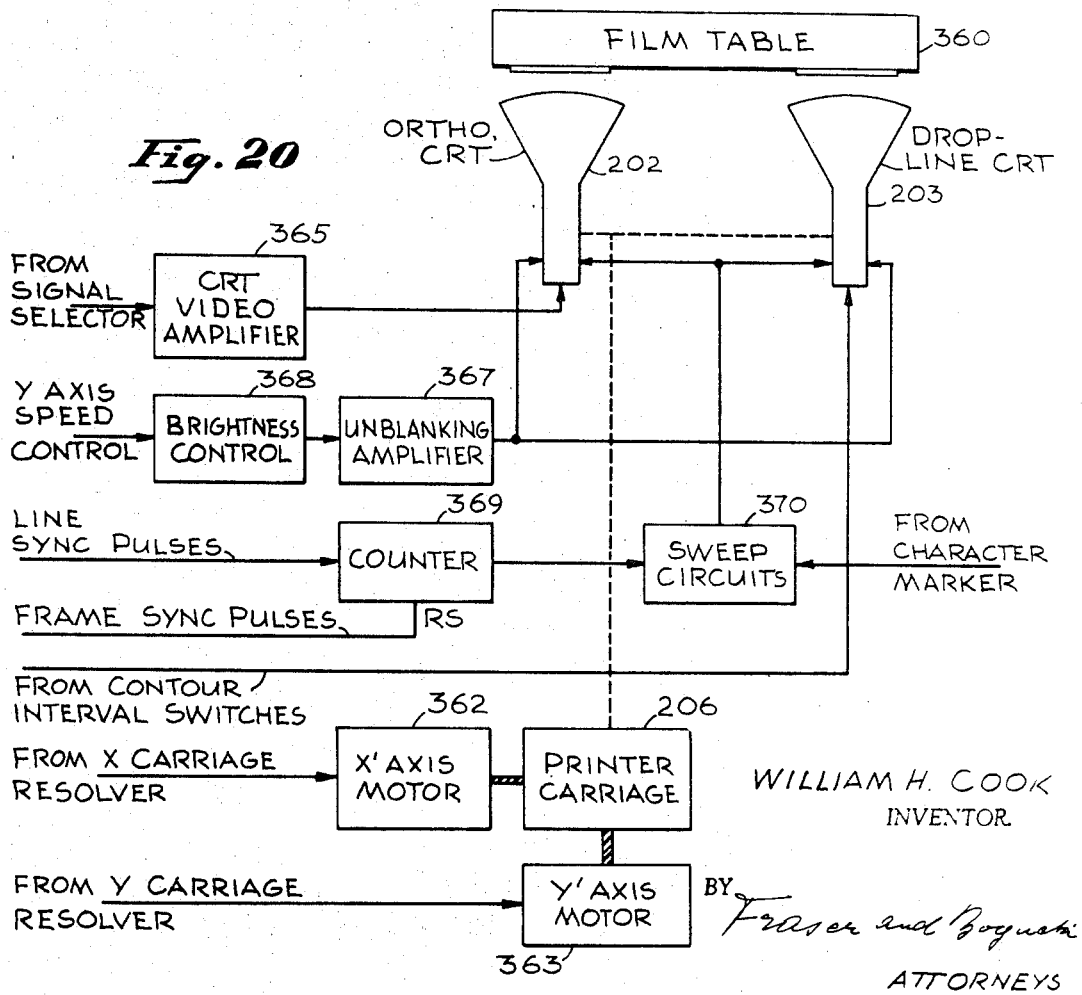
FIG. 20 is a block diagram representing the printer portion of the arrangement of FIG. 10 in greater detail.

The printer 200, utilized in the specific arrangement of FIG. 10, is shown in somewhat greater detail in FIG. 20. As shown, the printer 200 includes an orthophoto print-out cathode ray tube 202 and a drop-line print-out cathode ray tube 203 disposed adjacent a film table 360 on which film plates may be mounted for exposure by the beams of the respective cathode ray tubes 202 and 203. The cathode ray tubes are moved across the film table 360 by the printer carriage 206 which is driven in the X- and Y-directions by an X' axis motor 362 and a Y' axis motor 363. The drive motors 362 and 363 receive control signals from the X-axis and Y-axis control circuits 207 and 208 so that the movement of the printer carriage 206 is slaved to the movement of the scanner carriage 119.

The selected video signal received from the signal selector 190 is amplified in a cathode ray tube video amplifier 365 and applied to the orthophoto print-out cathode ray tube 202 to modulate the electron beam thereof in accordance with the video information developed by the photomultipliers 150, 151. Scanner elevation information developed by the contour interval switches 196 is applied to the drop-line print-out cathode ray tube 203 to modulate the electron beam thereof in order to print out the desired drop-line chart. An unblanking amplifier 367 is controlled by a brightness control circuit 368 and a counter 369 to cause the cathode ray tubes 202 and 203 to be unblanked at the proper brightness level at selected times during the scanning of the image field. In the particular arrangement of the invention described, unblanking occurs once each frame in the middle of the frame to print out a selected portion of the line occurring during the unblanking interval. This operation is controlled by the counter 359 which is driven by the line sync pulses and reset by each frame sync pulse. The brightness control circuit 368 operates in response to signals from the Y-axis speed control 320 (FIG. 17) to reduce the intensity of the cathode ray tube beams as the speed of the scanner carriage 119 is reduced. Thus a more uniform relationship between beam intensity and scanning speed is provided which advantageously renders the film exposure level independent of scanning speed.

Sweep circuit 370 for controlling the sweep of the beams of the respective cathode ray tubes 202 and 203 is connected to the counter 369 and controlled in accordance with signals from the character marker 204. The character marker 204 comprises conventional circuitry for generating selected Lissajous figures which may be superimposed on the orthophoto and drop-line chart at desired points. The respective characters corresponding to the selected Lissajous figures are chosen by the operator and are generally used for marking particular points of interest in the field of operation.

Operation of the stereomapping system in the automatic stereomapping mode as described above produces both an orthophoto and a drop-line or altitude chart representing respectively the photographic detail and the corresponding elevation of the terrain portrayed in the stereoscopic diapositives. In practice, the orthophoto is compared in the system of the present invention with a corresponding orthophoto of the same terrain derived from photographs taken at a different time from those used to prepare the first orthophoto in order to provide automatically an indication of any cultural changes which may have occurred in the interim.

Figure 21:
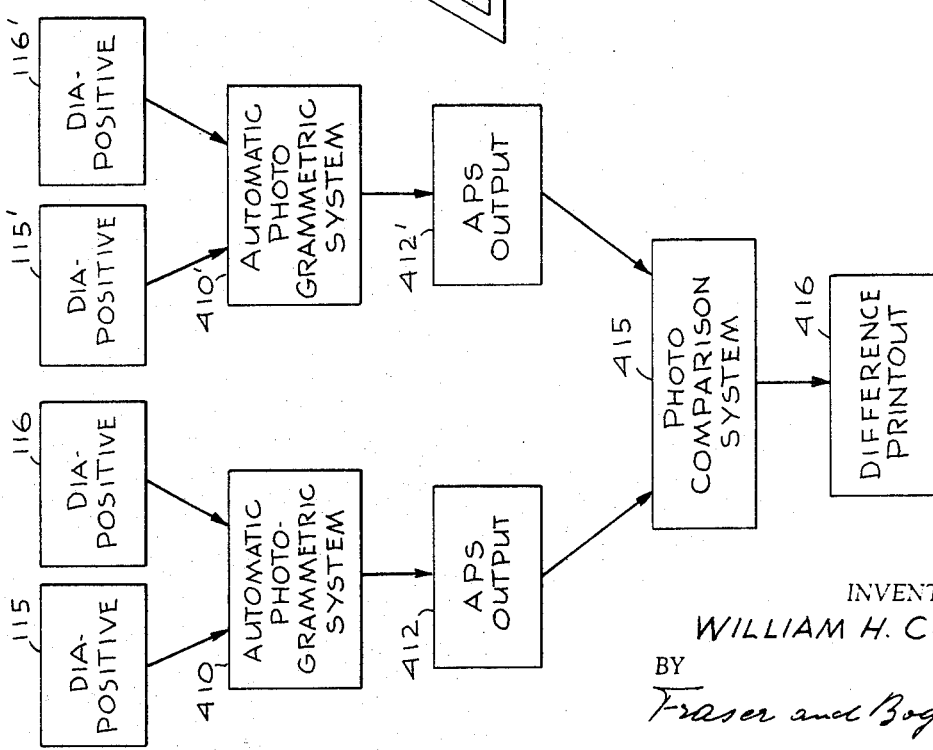
FIG. 21 is a block diagram representing the use of a photo comparison system in accordance with the invention.

A block diagram representing one arrangement for utilizing the present invention is shown in FIG. 21. This diagram depicts an automatic photogrammetric system 410 having as inputs a pair of diapositives 115 and 116 and producing an output 412 which is supplied to a photo comparison system 415. Similarly, an automatic photogrammetric system 410' is shown having as inputs a pair of diapositives 115' and 116' and producing an output 412' which is also supplied to the photo comparison system 415. The primed designations have been utilized to indicate the same or equivalent equipment operated at a different time from the corresponding unprimed elements. In response to the supplied information, the photo comparison system 415 produces a difference print-out 416 which is an indication of the particular areas having undergone any change during the time interval elapsing between the taking of the respective diapositive pairs, 115, 116 and 115', 116'. In one particular arrangement in accordance with the invention, the automatic photogrammetric systems 410 and 410' may comprise the automatic stereomapping system described above. Although for some purposes it may be desirable to provide an indication of the differences between corresponding drop-line charts, it is generally more practical to supply corresponding orthophotos for comparison in the photo interpretation system 415. Therefore, for the purposes of this example, let it be assumed that the outputs 412, 412' of the automatic photogrammetric systems 410, 410' are orthophotos of the same area but derived from photographs which are taken at different points in time. These corresponding orthophotos may then be compared in the photo comparison system 415 to provide a difference print-out 416 which indicates the particular areas having undergone change in the elapsed time interval. The difference print-out 416 may be in the form of photo maps corresponding to one of the input orthophotos but showing only the portions which have undergone change; it may be photographic charts showing the extent to which changes have been detected between corresponding portions of the respective orthophotos, thus emphasizing the areas experiencing cultural change and indicating the nature of that change; or it may be a pair of photo maps corresponding respectively to the input orthophotos but showing only the portions which have undergone change. In the last mentioned manner of print-out display, it is a simple matter for the human photo interpreter to compare the printed out portions in order to determine the significance of the changes which have been indicated.

In one particular arrangement of a photo interpretation system in accordance with the invention, the stereomapping system of the above cited co-pending patent application is employed with a modification to limit print-out to only those areas in which the correlation drops below a predetermined level. The particular modification of the stereomapping system to achieve such operation is shown in the diagram of FIG. 13 and includes the threshold circuit 210 and the selector switches 209A, 209B, and 209C. When the described system is operated in the stereomapping mode, the switches 209A–209C are in the positions shown in FIG. 13. However, when the system is employed for automatic photo comparison to detect the differences between a pair of orthophotos, the switches 209A–209C are moved to a second position, closing a circuit path from the threshold circuit 210 to the inhibit lead of the OR-gate 352 in FIG. 19, and opening the circuit paths from the electronic switch 262 and the no-track control stage 265 of FIG. 13 to the Y speed control circuit 320 of FIG. 17. Opening switches 209A and 209B serves to disable the portion of the system which slows down or stops the Y servo motor when a lack of correlation of the signals from the respective photomultipliers is encountered. When the system is utilized as a photo comparison system 415, the respective orthophotos 412, 412' are scanned just as were the respective diapositives which produced the orthophotos. However, because the orthophotos are true orthographic projections of the depicted terrain without parallax displacements due to variations in elevation, the elevation control circuitry is not needed and scanning of the orthophotos may be conducted at a constant elevation setting.

During the scanning procedure, the video signals from the photomultipliers P1 and P2 are applied to the Z sensor correlator 236 of FIG. 13 which produces an output signal varying in amplitude as a function of the degree of correlation of the photomultiplier signals. This output signal is filtered in the filter 239 and applied to the threshold circuit 210 which produces an output signal to inhibit the signal selector 190 so long as the correlation signal is above a predetermined threshold level. When the system scans an area in which cultural changes have occurred, the correlation decreases and the correlation signal applied to the threshold circuit 210 falls below the preselected threshold level. The threshold circuit 210 thereby fails to provide an output signal and the signal selector 190 is enabled to pass one or the other of the video signals to the printer 200 for reproduction as an indication of detected change. From the operation of the photo comparison system of the invention in this manner, a valuable tool is provided for automatically scanning various photos which are to be compared in order to detect cultural changes which may have occurred, thus accelerating the process considerably and freeing the photo interpreter for the job of applying his judgment to determine which changes are important.

A second particular arrangement in accordance with the invention makes use of the automatic map compilation system of the above cited co-pending patent application Ser. No. 240,638. The automatic map compilation system performs a similar function to that of the automatic stereomapping system but does it through the use of electronic scanning techniques under the control of a digital computer, whereas the automatic stereomapping system employs electromechanical apparatus for this purpose.

The automatic map compilation system is described in detail in the cited co-pending application. However, in order that its operation may be briefly described herein, it is represented in simplified block diagram form in FIG. 22. As shown therein, the automatic map compilation system comprises a movable table 422 on which the diapositives 115 and 116 may be affixed together with the orthophoto and altitude chart negatives $N_1$ and $N_2$, respectively. The table 422 is movable over a traverse pattern similar to that of the stereomapper as shown in FIG. 2 under the control of the X and Y drive stage 424 which is responsive to commands from a computer 450. Electronic scanning of the respective diapositives 115, 116 is accomplished by means of a pair of flying spot scanners 435 and 436 which generate scanning rasters from which light is directed through the movable lenses 428 and 429. Deflection circuits 441 and 442 are connected to the flying spot scanners 435, 436 to determine the position of the scanner rasters. Lens servos 430, 431, 432, and 433 are provided to move the respective lenses 428, 429 under the control of the computer 450 in order to select the particular portions of the diapositives 115, 116 which are to be scanned at a given instant. Positioning error signals derived from the servos 430–433 are applied to the deflection circuits 441 and 442 in order to move the respective scanner rasters appropriately to compensate for any inherent delays in the response of the servos 430–433. The respective photographic details and altitude information are printed out on the negatives $N_1$ and $N_2$ by the orthophoto cathode ray tube 437 having an associated deflection circuit 443 and by the altitude line projector 438. Photomultipliers 461 and 462 are positioned adjacent the diapositives 115 and 116 to provide video signals corresponding to the modulated light beams received from the flying spot scanners 435, 436 through the diapositives. These video signals are applied to a mode control stage 468, a selector 466, and a height and tilt error sensing stage 455. A sync pulse generator 445 is provided to control the various deflection circuits 441-443. A raster shape modulator 454 also supplies signals to the flying spot scanner deflection circuits 441, 442 which control the shape and scale of the respective scanner rasters in order to achieve accurate correspondence between the respective scanned portions of the diapositives 115, 116 and the orthophoto negative $N_1$. The computer 450 supplies signals to the analog portions of the circuit via digital-to-analog (D/A) converters 451 and receives analog signals from the system via the analog-to-digital (A/D) converter 452.

In the operation of the automatic map compilation system as shown in FIG. 22, changes in apparent height are produced by providing relative displacement between the respective diapositives 115, 116 rather than by actually moving a scanning element in the vertical direction. The scanned portions of the diapositives 115, 116 are displaced in this fashion by means of the movable lenses 428 and 429 under the control of the servos 430–433. The result however is similar, so that the discussion with respect to the variations in time occurrence of the pulses at the respective photomultipliers 461, 462 as shown in FIG. 12 is applicable here. The video signals from the photomultipliers 461, 462 are correlated in the height and tilt error sensing circuit 455 which, by applying signals to the deflection circuits 441, 442 via the A/D converter 452 and the raster shape modulator 454, serves to correct height error at each line scan of the flying spot scanner rasters until the detected height error is eliminated. The computer 450 is supplied with information regarding the degree of height correction and stores this information as an indication of the height at the particular point being scanned. The computer 450 then calculates the estimated height of the next point to be scanned and provides appropriate signals to direct the beams from the flying spot scanner to that point in each diapositive.

As the table 422 moves in a predetermined traverse pattern, the negatives $N_1$ and $N_2$ are also moved under the cathode ray tube 437 and the altitude line projector 438 to print out the respective orthophoto and altitude chart. The cathode ray tube 437 receives the preferred one of the two video signals from the photomultipliers 461, 462 as selected by the selector 466. The altitude line projector 438 is controlled by signals from the computer 450 to print out the corresponding altitude information.

The mode control stage 468 is provided to select the operating mode of the system. During the manual mode, the system is prepared for automatic operation and at this time the computer 450 is provided with input data relating to the photogrammetric parameters of the respective diapositives 415, 416. Certain portions of this information are modified in a prescribed alignment procedure during operation in the manual mode in order to adjust for the precise positions of the diapositives 115, 116 as they are placed on the table 422. When the system has been set up properly and the scanning system aligned at a preselected starting point, the mode control stage 468 is set in the automatic mode position to initiate automatic operation of the map compilation system. Operation in this manner as an automatic photogrammetric system 410 or 410' of FIG. 21 provides the desired automatic photogrammetric system output 412 or 412' as described.

The gate circuit 470 is connected in accordance with the present invention to the above described automatic map compilation system in order to achieve the desired automatic photo comparison system operation. As indicated in FIG. 22, the gate 470 is connected to receive a control signal from the height and tilt error sensing circuit 455 which determines whether or not the video signal from one of the photomultipliers, in this case the photomultiplier 461, is passed through the gate 470 to be printed out on the orthophoto negative $N_1$. The height and tilt error sensing circuit 455 contains a correlator circuit such as that represented schematically in FIG. 15 which develops an output signal whose amplitude is proportional to the degree of correlation occurring between a pair of input signals. Thus when the video signals from the photomultipliers 461, 462 are supplied as input signals to this correlator circuit, the output signal is relatively large if the video signals correspond to essentially identical terrain, whereas the output signal is relatively small if the terrain corresponding to the respective video signals has undergone cultural change between the taking of the respective sets of diapositives which were the sources of the respective orthophotos being scanned by the photo comparison system. When the signal from the correlator included in the height and tilt error sensing circuit 455 is large, the gate 470 is inhibited from passing the video signals to the print-out circuitry. During operation in the automatic photo comparison mode, the switch 471 is moved to complete a path between the gate 470 and the cathode ray tube 437. Otherwise the system represented in FIG. 22 may be operated substantially as it is normally operated for automatic map compilation. The demands on the system when operating in the automatic photo comparison mode are considerably decreased, however, since after the proper elevation level is established, there is no need to change it because the respective orthophotos being examined in the positions of the diapositives 115 and 116 in effect depict the terrain as reduced to a constant altitude level. So long as the corresponding terrain of the respective orthophotos is the same, the gate 470 is inhibited and there is no print-out on the orthophoto negative $N_1$. However, should the corresponding portions of the two input orthophotos indicate a change in terrain, the inhibiting signal applied from the height and tilt error sensing circuit 455 to the gate 470 drops to a low level and the gate 470 is enabled to pass video signals from the photomultiplier 461 to the cathode ray tube 437 via the switch 471 for print-out on the orthophoto negative $N_1$. When printed in this fashion, the output of the photo interpretation system is an orthophoto corresponding to one of the input orthophotos but showing only the areas in which significant change has been encountered. If desired, the correlation signal may first be applied to a threshold circuit such as the circuit 210 of FIG. 13 so that the gate 470 is enabled only when the correlation signal falls below a predetermined level.

Figure 23:
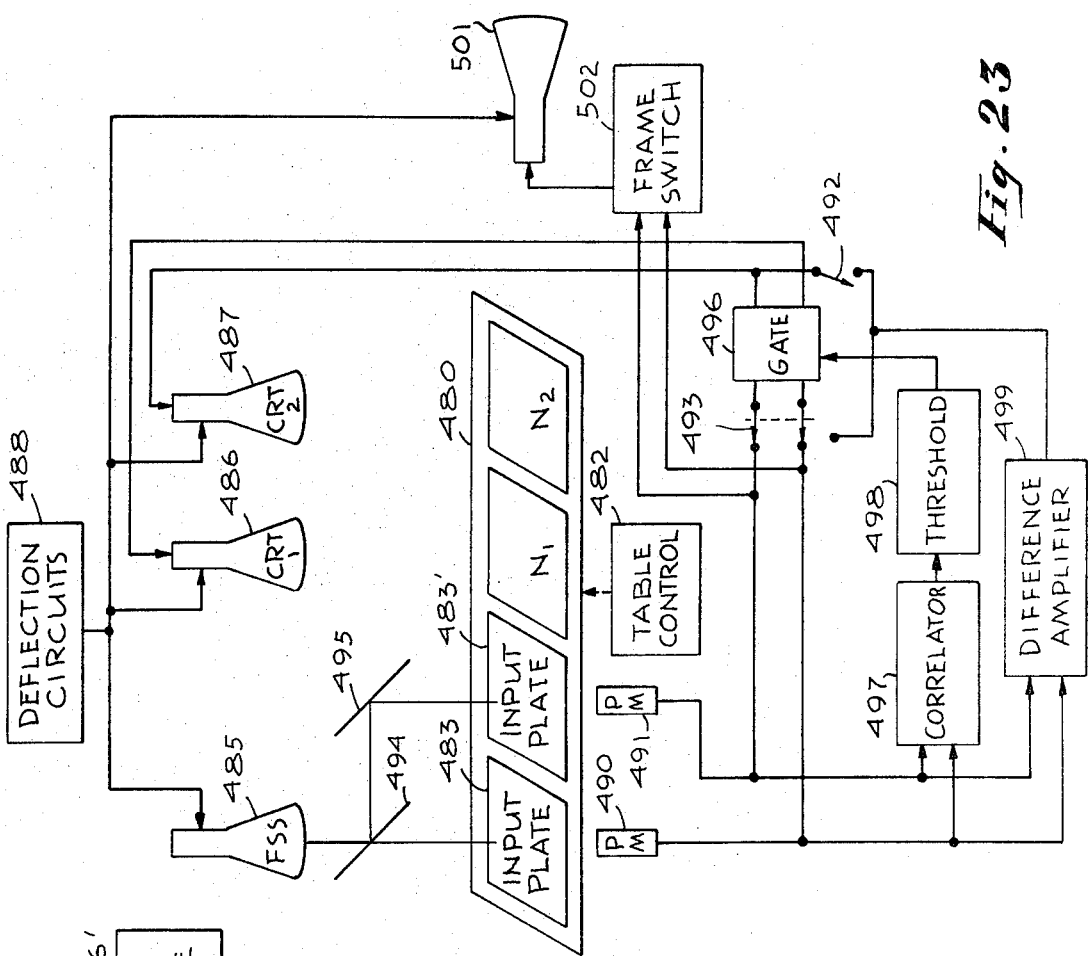
FIG. 23 is a block diagram of a simplified arrangement in accordance with the invention.

FIG. 23 is a block diagram of a simplified arrangement in accordance with the invention for scanning a pair of input plates to provide the desired photo comparison and automatic print-out of the particular areas of interest without dependence upon a more complex automatic photogrammetric system of the types described above. In the usual situation, automatic height following is unnecessary in an orthophoto comparison system since the terrain of the input orthophotos is represented in flat projection. It is thus unnecessary to tie up the more complex equipment such as the automatic stereomapping system or the automatic map compilation system, both of which include the capability of height following, when a simplified arrangement of the invention as shown in FIG. 23 is available.

In the block diagram of FIG. 23, a movable table 480 is shown controlled to follow a selected profiling pattern under the control of the table control stage 482. A pair of input plates 483 and 483', which may be corresponding orthophotos derived from diapositives of the same terrain taken at different times, are shown placed in position on the table 480 together with a pair of output negatives $N_1$ and $N_2$. A flying spot scanner 485 is arranged to provide a scanning raster for illuminating selected portions of the input plates 483, 483' in time correspondence. A half-silvered mirror 494 and a second mirror 495 are positioned to provide the desired scanning of corresponding portions of the input plates 483, 483' from the single flying spot scanner 485. Photomultiplier tubes 490 and 491 are positioned to receive the light beams from the flying spot scanner projection system as they pass through the input plates 483, 483'. A pair of print-out cathode ray tubes 486 and 487 are associated respectively with the output negatives $N_1$, $N_2$ to print the desired information. Deflection circuits 488 control the positioning of the electron beams of the flying spot scanner 485 and the cathode ray tubes 486 and 487. Video signals from the photo multipliers 490, 491 are directed to a gate 496 via a switch 493 for application to the cathode ray tubes 486, 487. The gate 496 is controlled by a threshold circuit 498 which receives a correlation signal from the correlator 497 in response to the video signals applied thereto. The video signals are also applied to a difference amplifier 499, the output of which may be selected by the switch 493 to provide a somewhat different display of output information.

In the operation of the arrangement in accordance with the invention depicted in FIG. 23, the input plates 483, 483' of precisely the same scale and with all relief displacement removed are positioned very precisely on the table 480 and the mirrors 494, 495 are arranged to direct light beams from the flying spot scanner 485 to exactly corresponding portions of the input plates 483, 483'. The half-silvered mirror 494 permits a portion of the incident light to pass through to the input plate 483 while reflecting the remaining portion of the light to the mirror 495 which in turn reflects the light to the input plate 483'. Since, in the usual situation, the input plates 483, 483' will have been produced to identical scales on suitable photogrammetric systems, the scanning of the corresponding portions thereof follows automatically as the table 480 is moved back and forth under the control of the stage 482 so long as there is no rotation of the table 480. The video signals from the photomultipliers 490, 491 are applied to the correlator 497 which may be in the form of the circuit represented schematically in FIG. 15. The output of the correlator 497 is applied through the threshold circuit 498 to inhibit the gate 496 from passing any of the video signals applied thereto for print-out by means of the cathode ray tubes 486, 487. The gate 496 is thus inhibited so long as the video signals possess a significant degree of correlation. However, when the correlation between the respective video signals falls below a preselected level as determined by the setting of the threshold circuit 498, thus indicating the appearance of significant change in the terrain represented by the two input plates, the gate 496 is enabled to pass the video signals for print-out by the cathode ray tubes 486, 487. Operation of the arrangement of the invention depicted in FIG. 23 in this manner provides a pair of orthophotos printed out on the negatives $N_1$, $N_2$ which show only the portions of the terrain which have undergone significant change. The portions of the two negatives $N_1$, $N_2$ which are printed out will differ, since the negatives correspond respectively to the two input plates 483, 483'. Thus the print-out negatives may be compared directly by the human photo interpreter to determine the type of change that has been detected and whether it is of interest or not.

A somewhat different display of output information may be realized by operating the arrangement of the invention shown in FIG. 23 with the switch 493 placed in the lower position. With the switch 493 in this position, the video signals from the photomultipliers 490, 491 are no longer applied to the gate 496 which instead receives as a single input the output of the difference amplifier 499. Operation in this manner provides print-out information on only a single output negative $N_1$ which is printed by the cathode ray tube 486. The difference amplifier 499 may comprise conventional circuitry known in the art which is arranged to provide an output corresponding to the difference between a pair of input signals. Thus where the video signals on the photomultipliers 490, 491 are substantially identical, the output signal is approximately zero. However, when a difference in the video signals is encountered, this difference is reproduced at the output of the difference amplifier 499 and applied to the gate 496 to be printed out on the negative $N_1$ whenever the output of the correlator 497 falls below the preset level of the threshold circuit 498. If desired, this difference signal may be applied directly to the cathode ray tube 487 via the switch 492 to by-pass the gate 496. In such a case, the output will be in the form of a photograph having a substantially constant background shade with the areas of change emphasized by printing in contrasting shades which vary in accordance with the degree of difference between the respective video signals.

In the arrangement in accordance with the invention depicted in FIG. 23, an additional display for detecting changes in terrain as depicted by a pair of input photographs taken at different times is provided by virtue of a display device 501 coupled to receive the output of a frame switch 502. The frame switch 502 receives the video signals from the photomultipliers 490 and 491 respectively, and switches between the two inputs alternately at a programmed rate to emphasize any changes to an observer. The display device 501 is coupled to receive the usual deflection voltages from the deflection circuits 488. In this case, the table 480 may be fixed in position and the scanning expanded by operating the flying spot scanner 485 in the manner of a conventional television scanner viewing the entire photograph area. In this particular display arrangement, first one input photograph and then the other is alternately reproduced as a display by the display device 501. By watching the display presented in this fashion, an operator can quickly distinguish the areas of particular terrain which have undergone change, since the rapid presentation of the two photographs in succession makes any differences between the two readily apparent. This display arrangement utilizes what may be called the "flicker" technique for rapid comparison of two input photographs. By using the flicker technique in accordance with this particular arrangement of the invention, an extremely rapid comparison of various input photographs can be made with relatively simple equipment, thus materially reducing the demands upon the human operator in the photo interpretation process. As described, the particular arrangement of the invention as shown in FIG. 23 may be used for direct comparison by means of the display device 501 following the so-called flicker technique, or it may be operated on an automatic print-out basis to provide a record of the detected differences between the pair of input photographs. Additionally, any previously known arrangements for providing photograph comparison may be employed in the practice of the present invention.

The above-described arrangements in accordance with the invention advantageously serve to perform automatically the photographic comparison procedures which heretofore have been dependent upon human performance. The present invention thus materially speeds up the photo interpretation process while eliminating the errors that occur from dependence upon operation by human beings and it further frees the human photo interpreter for work in the area in which human judgement is needed. The automatic photo comparison system in accordance with the invention provides for the presentation of output information in a number of different display patterns for use in different circumstances under the selection of an operator.

Although there have been described above various specific arrangements of an automatic photo comparison system in accordance with the invention for the purpose of illustrating the manner in which the invention may be used to advantage, it will be appreciated that the invention is not limited thereto. Accordingly any and all modifications, variations or equivalent arrangements falling within the scope of the annexed claims should be considered to be a part of the invention.

What is claimed is:

1. A system for detecting changes in terrain occurring over a predetermined time interval, comprising:
    means for presenting simultaneously in the form input information corresponding to said terrain at different times, one at the beginning and one at the end of said time interval;
    means for comparing said input information corresponding to said different times; and
    output means coupled to the comparing means for repeating only selected portions of said input information corresponding to portions of the terrain undergoing change over said time interval.

2. A system for indicating the changes which may have occurred in the features of a three dimensional photographically recordable subject over a given period of time, comprising:
    means for receiving images for a pair of different records each respectively depicting an image constituting an orthophographic representation of said subject as viewed at the beginning and end of said given period;
    means for comparing to the same orthographic projection scale representations of the images depicted by said records; and
    means coupled to the comparing means for reproducing portions of a selected record of said pair corresponding to the occurrence of a mismatch encountered by the comparing means.

3. A system for automatically comparing input information, comprising:
    dual channels arranged to receive orthographically projected input information,
    means for automatically scanning corresponding portions of the input information in said dual channels,
    correlating means coupled to the scanning means for providing a signal which is proportional to the degree of correlation of the corresponding portions of the input information,
    output means for repeating said input information, and
    gating means connected to the scanning means and responsive to said signal for passing input information to the output means only when said signal falls below a predetermined level.

4. A system for automatically comparing input information comprising:
    dual channels for receiving input information in the form of a pair of photographs in like projection,
    means for automatically scanning corresponding portions of the photographs in said dual channels,
    correlating means coupled to the scanning means for providing a signal indicative of the degree of correlation of corresponding portions of the photographs,
    means for printing a record in accordance with the photographs, and
    gating means coupled to the scanning means and responsive to said signal for passing information from at least one photograph to the record printing means in the event of a lack of correlation between corresponding portions of the input information.

5. A system for automatically comparing input information comprising:
    means for automatically scanning in synchronism predetermined corresponding portions of a pair of input photographs,
    means for generating video signals representing the scanned portions of the photographs,
    means for comparing the video signals to provide an indication of the correspondence therebetween, and
    output means responsive to the comparing means for reproducing those portions of a selected photograph of said pair corresponding to a lack of correspondence between the respective video signals.

6. A system in accordance with claim 5 wherein said comparing means comprises a difference amplifier arranged to develop a difference signal corresponding to the difference between the respective video signals and means for applying said difference signal to the output means to control the reproduction of said selected photograph portions.

7. A system in accordance with claim 5 wherein said comparing means comprises a correlator for providing a correlation signal proportional to the degree of correlation of the respective video signals and means responsive to the correlation signal for selectively controlling the application of the video signals to the output means.

8. A system in accordance with claim 7 wherein the means responsive to the correlation signal comprises a gate circuit coupled to receive the video signals, said gate circuit being controllable by the correlation signal.

9. A system in accordance with claim 8 further including a threshold circuit coupled to receive the correlation signal and to inhibit the gate circuit in the presence of correlation signals above a predetermined threshold.

10. An automatic photo comparison system comprising:
    means for presenting correspondingly projected input information representing particular terrain at different times,
    means for comparing said input information for related small areas of the terrain to determine the degree of correlation between corresponding areas at said different times, and
    means coupled to the comparing means for providing an output record depicting only the portions of the terrain encountering changes in the interval between the different times at which the respective input information originated.

11. An automatic photo comparison system comprising:
    a signal correlating means,
    means for scanning in time coincidence corresponding portions of a pair of input photographs,
    means for generating video signals for application to said correlating means in response to said scanning means, and
    print-out means coupled to the correlating means for providing reproductions of only particular portions of a selected input photograph corresponding to a lack of correlation of said video signals.

12. An automatic photo comparison system comprising:
    means for mounting a pair of orthophotos representing corresponding input information,
    a flying spot scanner for automatically scanning corresponding portions of the orthophotos,
    a pair of photomultipliers coupled to receive light passing through the orthophotos in order to generate respective video signals in response thereto,
    means for printing out a record in response to said video signals,
    correlating means for indicating the degree of correlation of the respective video signals, and
    gating means connected to the correlating means and coupled between the photomultiplier and the record printing means to block the video signals from the record printing means whenever the degree of correlation is above a preset level.

13. An automatic photo comparison system comprising:
    a table for positioning a pair of orthophotos representing corresponding input information,
    a single flying spot scanner,
    light directing means disposed to direct light from the flying spot scanner to corresponding portions of the orthophotos, first and second cathode ray tube display devices, deflection means for controlling the positions of the electron beams of the flying spot scanner and the cathode ray tube display devices, photoelectric means for generating respective video signals corresponding to the light from the scanned portions of the orthophotos, gating means connected between the photoelectric means and the cathode ray tube display devices and arranged to block the passage of the video signals to the cathode ray tube display devices upon the application of a gate control signal, a correlator coupled to receive the video signals and to provide a correlation signal in response thereto, and a threshold circuit coupled between the correlator and the gate circuit for applying a gate control signal in the presence of the correlation signal above a predetermined threshold.

14. An automatic photo comparison system comprising:

a table for positioning a pair of orthophotos taken at different times but representing corresponding terrain, a single flying spot scanner, a half-silvered mirror disposed to pass a portion of the light from the flying spot scanner to one of the orthophotos while reflecting the remainder of the light incident thereon, a second mirror disposed to direct light from the half-silvered mirror to the other orthophoto in order to scan corresponding portions of the orthophotos, first and second cathode ray tube display devices, deflection means for controlling the positions of the electron beams of the flying spot scanner and the cathode ray tube display devices, photoelectric means for generating respective video signals corresponding to the light from the scanned portions of the orthophotos, gating means connected between the photoelectric means and the cathode ray tube display devices and arranged to pass to video signals to the cathode ray tube display devices in the absence of a gate control signal, a correlator coupled to receive the video signals and to provide a correlation signal in response thereto, and a threshold circuit coupled between the correlator and the gate circuit for applying a gate control signal in the presence of a correlation signal above a predetermined threshold, whereby the first cathode ray tube display device presents a display of the terrain undergoing cultural change as it appeared before the change and the second cathode ray tube display device presents a display of the same terrain as it appeared after the change.

15. A photo comparison system comprising:

means for presenting different views of particular terrain taken at different times but in a form having corresponding projection in the respective views, means for synchronously scanning corresponding portions of the respective views, means responsive to the scanning means for developing electrical signals on individual channels in accordance with the views being scanned, switching means for selecting means for selecting between the individual channels, display means coupled to the switching means for presenting in succession the images corresponding to the signals selected by the switching means, and means for graphically reproducing only selected portions of said views.

16. A photo comparison system comprising:

means for scanning a pair of photographs representing particular terrain in corresponding projection, means responsive to the scanning means for providing video signals on respective channels corresponding to the photographs, display means for reproducing images corresponding to the photographs in response to the video signals, switching means coupled between the video signal channels and the display means for alternately applying the respective video signals to the display means, means for correlating the video signals on said channels, and means responsive to the correlation means for reproducing only portions of said photographs exhibiting a selected range of correlation.

* * * * *